US006823116B2

(12) United States Patent
Inui et al.

(10) Patent No.: US 6,823,116 B2
(45) Date of Patent: Nov. 23, 2004

(54) OPTICAL WAVEGUIDE DEVICE MANUFACTURING JIG, METHOD OF MANUFACTURING OPTICAL WAVEGUIDE DEVICE BY USE OF THE SAME JIG, AND THE SAME OPTICAL WAVEGUIDE DEVICE

(75) Inventors: Yukitoshi Inui, Nishikasugai-gun (JP); Kuniyoshi Kondo, Nishikasugai-gun (JP); Manabu Kagami, Aichi-gun (JP); Tatsuya Yamashita, Aichi-gun (JP); Akari Kawasaki, Aichi-gun (JP); Hiroshi Ito, Aichi-gun (JP)

(73) Assignee: Toyoda Gosei Co., Ltd., Aichi (JP)

( * ) Notice: Subject to any disclaimer, the term of this patent is extended or adjusted under 35 U.S.C. 154(b) by 91 days.

(21) Appl. No.: 10/216,224

(22) Filed: Aug. 12, 2002

(65) Prior Publication Data

US 2003/0031414 A1 Feb. 13, 2003

(30) Foreign Application Priority Data

Aug. 13, 2001 (JP) ...................... P2001-245705

(51) Int. Cl.[7] ................................................. G02B 6/26
(52) U.S. Cl. ......................................... 385/39; 385/147
(58) Field of Search ............................. 385/39, 62, 63, 385/81, 87–94, 136, 147

(56) References Cited

FOREIGN PATENT DOCUMENTS

| EP | 0 856 389 A2 | * | 8/1998 |
| EP | 1 284 426 A2 | * | 2/2003 |
| JP | 8320422 A | | 12/1996 |

* cited by examiner

*Primary Examiner*—Phan T. H. Palmer
(74) *Attorney, Agent, or Firm*—McGinn & Gibb, PLLC

(57) ABSTRACT

An optical fiber, a mixture solution of the photosetting resins polymerizing in two different polymerization types, and a transparent container are prepared. The photosetting resins are not copolymerized, and have different activation wavelengths of the photopolymerization initiators for hardening. Employing a combination in which the activation wavelength of a photopolymerization initiator for a photosetting resin with higher refractive index after hardening is longer than the activation wavelength of a photopolymerization initiator for a photosetting resin with lower refractive index after hardening, a core portion can be only formed by hardening the photosetting resin with higher refractive index due to a difference between two wavelengths. Thereafter, a clad portion can be formed by hardening two kinds of photosetting resins, whereby an optical transmission device can be manufactured.

14 Claims, 17 Drawing Sheets

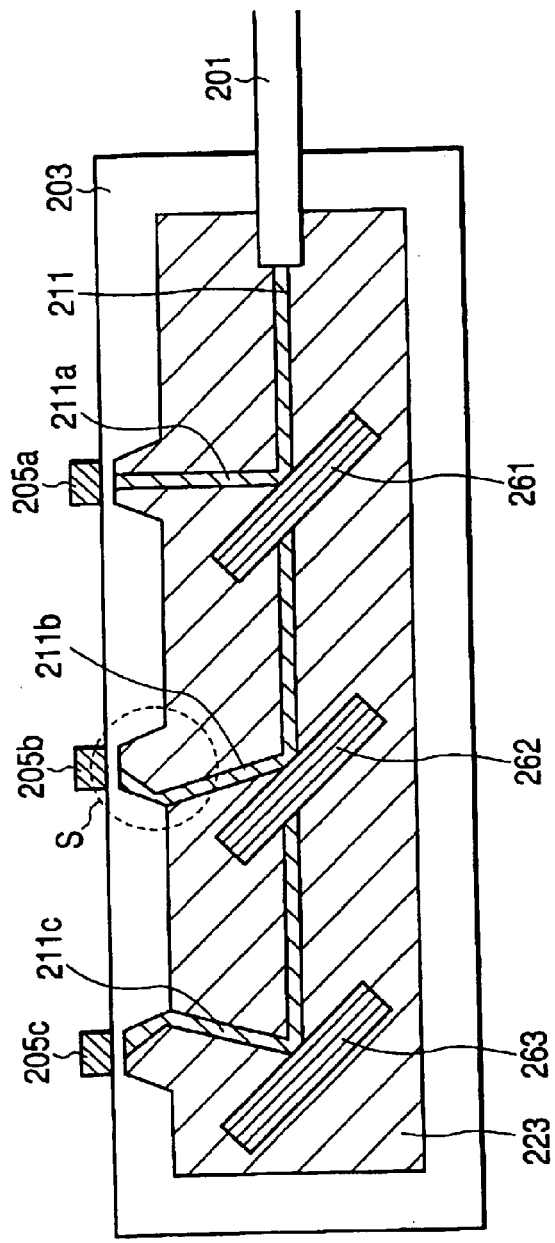
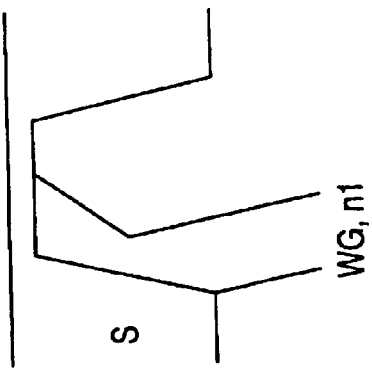
FIG. 4A
FIG. 4B

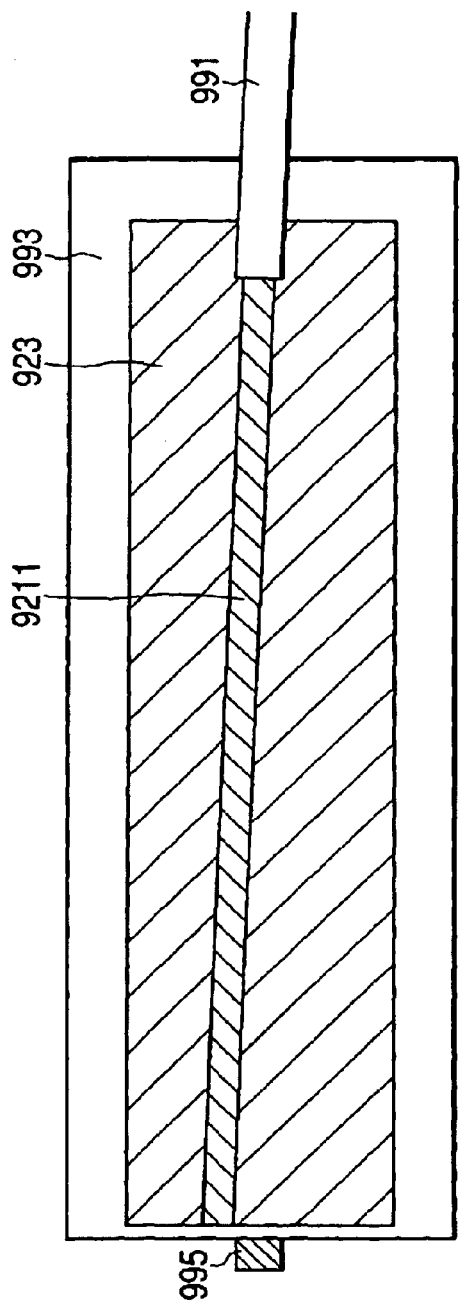
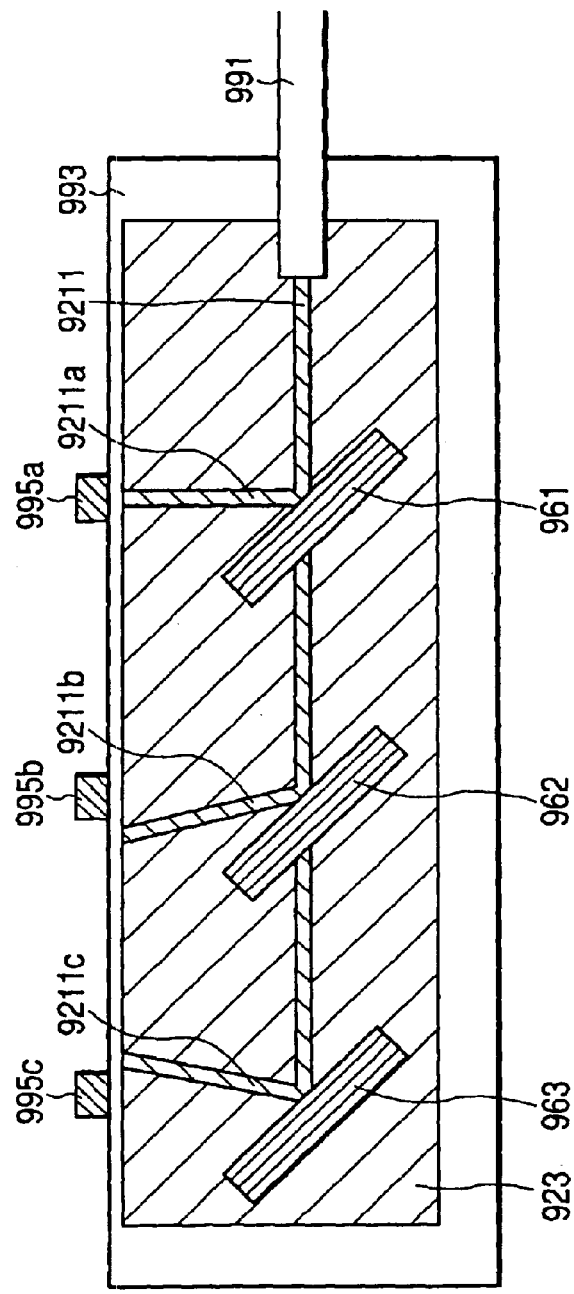
FIG. 23A
FIG. 23B

OPTICAL WAVEGUIDE DEVICE MANUFACTURING JIG, METHOD OF MANUFACTURING OPTICAL WAVEGUIDE DEVICE BY USE OF THE SAME JIG, AND THE SAME OPTICAL WAVEGUIDE DEVICE

The present application is based on Japanese Patent Applications No. 2000-365223, 2000-402883, 2001-54705 and 2001-165068, which are incorporated herein by reference.

BACKGROUND OF THE INVENTION

1. Field of the Invention

The present invention relates to a method for manufacturing an optical transmission device composed of a core portion and a clad portion from the photosetting resins. Further, the present invention is relates an optical transmission and reception module to be connected to an optical fiber and its manufacturing method.

2. Description of the Related Art

A conventional technique for forming an optical transmission device at the tip of an optical fiber using the photosetting resins is well known as described in Unexamined Japanese Patent Publication No. Hei. 4-165311, for example. This technique involves forming the optical transmission device by dipping one end of the optical fiber in a photosetting resin solution composed of fluorine monomer and applying a short wavelength laser in the ultraviolet radiation region from the optical fiber to the resin solution.

However, the conventional technique as above had the problem that a core could be only formed, unhardened monomer might stick to the optical transmission device formed, which necessitated a washing process, and the core was formed like a gourd as shown in FIGS. 1 to 3 of the above publication, and could not be formed cylindrically.

Further, a metal cable for transmitting or receiving an electrical signal has been employed for the communication between the devices. The typical metal cable is conformable to the IEEE1394 standard standardized by the IEEE (Institute of Electrical and Electronic Engineers). In this IEEE1394 standard, the Data signal and the Strobe signal relevant to it are transmitted simultaneously.

More particularly, a metal cable 150 conforming to the IEEE1394 standard typically has a 6-pin connector 154 (or alternatively a 4-pin connector) connected at both ends of a cable 152, as shown in FIG. 22. Each pin of the connector 154 (in the order from the first pin to the sixth pin) is supplied with a power source (voltage) from an outside apparatus connected to the connector 154 and the GND to enable four signals of TPA, TPA*, TPB and TPB* to be input or output. A sign "*" denotes an inverse signal. On the receiving apparatus, TPA and TPA* are received and either one of them is used as the Data signal, and TPB and TPB* are received and either one of them is used as the Strobe signal.

The cable 152 has internally two pairs of pair signal conductors 156A, 156B that are called an STP (Shielded Twist Pair Cable), a power conductor 158 for supplying an electric power and a ground conductor 160, whereby one cable 152 has a total of six lines. To reduce the influence of noise caused by the electric or magnetic field, the cable 152 has each of the pair signal conductors 156A, 156B twisted and covered with a shield 162A, 162B, and further is covered entirely with a shield 164.

However, in the IEEE1394 standard, the STP is less sufficient to prevent signal deterioration due to the noise, the length of cable being limited to 4.5 m, which means that the STP can not be employed for the long distance connection between the devices.

Therefore, the IEEE1394.b standard for optical transmission is about to be instituted to enable the connection between the remote sites by optically transmitting or receiving the signal. This IEEE1394.b standard is intended for the bi-directional communications, employing two wires.

Also, a technique for the multi-directional communications has been proposed. In this technique, an optical module for enabling the bi-directional communications through the single wire line has been examined.

However, to employ the IEEE1394.b standard to constitute the devices, each device must be equipped with the IEEE1394.b standard, so that the total system is more expensive. Further, if there is the need of making connection to the conventional device conforming to the IEEE1394 standard, each device must be equipped with two standards, so that the cost of the total system is increased.

Since the optical module examined above makes the bi-directional communication through the single wire line, it is necessary to have different light wavelengths for transmission and reception to improve the signal quality. This is required to decrease the cross talk of light. Therefore, the optical module has the higher cost.

SUMMARY OF THE INVENTION

The present inventors have made careful researches and found that an effective optical transmission device can be formed by employing two kinds of photosetting resins, and attained the present invention.

Namely, it is an object of the invention to provide a method for manufacturing an optical transmission device with favorable conditions for forming the effective optical transmission device employing two kinds of photosetting resins.

It is another object of the invention to provide a method for manufacturing a self-forming optical transmission device which can be formed in a desired terminal area even if the optical transmission device is deviated from a desired direction.

It is still another object of the invention to provide an optical transmission and reception module and a communication device which can effect stable communications of two relevant signals in simple and inexpensive manner, irrespective of a device-to-device distance.

Further, it is still another object of the invention to provide a method for forming an optical transmission device in which it is unnecessary to make the alignment of optical axis after forming the optical transmission device, and an optical transmission and reception module produced by this method.

In order to accomplish the above object, according to one aspect of the present invention, there is provided a method for manufacturing an optical transmission device including a mixing step for mixing a first photosetting resin comprising a first photopolymerization initiator and a first monomer or oligomer polymerized in a first polymerization type by the first photopolymerization initiator, and a second photosetting resin comprising a second photopolymerization initiator and a second monomer or oligomer polymerized in a second polymerization type that is different from the first polymerization type by the second photopolymerization initiator, a core forming step for forming a core portion of the optical transmission device by hardening the first photosetting resin by making the first irradiation that activates the first photopolymerization initiator but does not activate the second photopolymerization initiator, and a clad forming step for forming a clad portion of the optical transmission device by hardening both the first photosetting resin and the second photosetting resin by making the second irradiation that activates both the first and second photopolymerization initiators, characterized in that the first irradiation has a wavelength shorter than the longest wavelength required to activate the first photopolymerization and longer than the longest wavelength required to activate the second photopolymerization.

The core portion is formed by hardening the first photosetting resin, and the clad portion is formed by hardening each of the first and second photosetting resins, whereby the first photosetting resin after being hardened is required to have a high refractive index than the second photosetting resin after being hardened. Also, in the clad formation step, each of the first and second photosetting resins is hardened, but not copolymerized. After forming the core, if two photosetting resins are both hardened by second irradiation, and the refractive index of hardened mixed resins is lower than before, the clad portion can function. Herein, it is required to activate the first or second photopolymerization initiator at the longest wavelength necessary to cause hardening to form the core portion substantially.

According to another aspect of the invention, there is provided a method for manufacturing an optical transmission device including a mixing step for mixing a first photosetting resin comprising a first photopolymerization initiator and a first monomer or oligomer polymerized in a first polymerization type by the first photopolymerization. initiator, and a second photosetting resin comprising a second photopolymerization initiator and a second monomer or oligomer polymerized in a second polymerization type that is different from the first polymerization type by the second photopolymerization initiator, a core forming step for forming a core portion of the optical transmission device by hardening the first photosetting resin by making the first irradiation that activates the first photopolymerization initiator but does not activate the second photopolymerization initiator, and a clad forming step for forming a clad portion of the optical transmission device by hardening both the first photosetting resin and the second photosetting resin by making the second irradiation that activates both the first and second photopolymerization initiators, characterized in that the first irradiation has an amount of exposure more than the minimum amount of exposure required to harden the first photosetting resin substantially completely and smaller than the maximum amount of exposure not to harden the second photosetting resin completely.

Herein, in the first irradiation, the minimum amount of exposure required to harden the first photosetting resin almost completely means the amount of exposure to cause the extent of hardening sufficient for the core formation, and the maximum amount of exposure not to harden the second photosetting resin completely means the amount of exposure to form the core of a higher refractive index than the refractive index of the clad formed in the clad formation step, viz., the second photosetting resin may be contained by minute quantity in the core portion, if the refractive index of core is not decreased greatly. However, in the first irradiation, it is required that two photosetting resins are not copolymerized.

In the above method for manufacturing the optical transmission device, one of the first polymerization type and the second polymerization type may be radical polymerization, and the other may be cationic polymerization.

In the above method for manufacturing the optical transmission device, when the core of a length L (unit of cm) is formed in a time s (unit of second) employing a light with the wavelength $\lambda_w$ and the intensity of illumination $I_0$ (unit of $mW/cm^2$), the optical loss $\alpha$ (unit of dB/cm) of the first photosetting resin before being hardened and the minimum amount of exposure $\sigma_A(\lambda_w)$ (unit of $mJ/cm^2$) for hardening at the wavelength $\lambda_w$ may satisfy the following expression:

$$\alpha \leq \frac{10}{L} \log_{10} \frac{I_0 \cdot s}{\sigma_A(\lambda_w)} \qquad (1)$$

In the above method for manufacturing the optical transmission device, the first photopolymerization initiator is preferably activated through two photon absorption.

A core can be formed by mixing two kinds of photosetting resins, and hardening a photosetting resin having a higher refractive index alone by light irradiation; and thereafter a clad can be formed by hardening two kinds of photosetting resins at the same time. To allow this technique, light irradiation for forming the core may be made by a wavelength shorter than the longest wavelength required to activate the first photopolymerization initiator, and longer than the longest wavelength required to activate the second photopolymerization initiator. Thereby, an optical module can be easily constituted by combination of a reflection mirror or a half mirror, and a light emitting or light receiving element.

Also, light irradiation to form the core may be made by an amount of exposure more than the minimum amount of exposure required to harden the first photosetting resin substantially completely and smaller than the maximum amount of exposure not to harden the second photosetting resin completely. Thereby, an optical module can be also easily constituted by combination of a reflection mirror or a half mirror, and a light emitting or light receiving element.

Two kinds of photosetting resins may be hardened by combination of radical polymerization and cationic polymerization, whereby two kinds of photosetting resins not causing copolymerization in the first light irradiation process can be easily combined. An example of the photosetting resin hardened by radical polymerization may be a monomer or oligomer having an acryloyl radical or metacryloyl radical, photosensitive polyimide or styrene, or divinylbenzene or unsaturated polyester in combination with the photopolymerization initiator. Also, an example of the photosetting resin hardened by cationic polymerization may be a monomer or oligomer such as epoxy ring, oxetane ring, cyclic ether compound, cyclic lactone compound, cyclic acetal compound, and vinylether compound in combination with the photopolymerization initiator.

Examples of the photopolymerization initiator for radical polymerization may include benzyldimethylketal compounds, $\alpha$-hydroxyketon compounds, $\alpha$-aminoketon compounds, bisacylphosphineoxide compounds, metallocene compounds, and other radical photopolymerization initiators.

Examples of the photopolymerization initiator for cationic polymerization may include triarylsulfonium salt compounds, diaryl iodonium salt compounds, metallocene compounds, and other cationic photopolymerization initiators.

In forming the core portion by light irradiation, optical loss of the core portion is important to lengthen the core portion. When the core portion is formed in a length L (unit of cm), if a light with the intensity of illumination $I_0$ (unit of mW/cm$^7$) is supplied from a root of the core portion to the growth end, the intensity of illumination I (unit of mW/cm$^2$) at the growth end can be obtained in accordance with the following expression, assuming that the optical loss of the first photosetting resin before being hardened is α (unit of dB/cm), $$I = I_0 \cdot 10^{-\frac{\alpha L}{10}} \quad (2)$$

In order to form a core with the length L (cm) or more in a time s (unit of second) employing a light with the wavelength $\lambda_w$, it is required to satisfy the following expression with the minimum amount of exposure $\sigma_A(\lambda_w)$ (unit of mJ/cm$^2$).

$$\sigma_A(\lambda_W) \leq I_0 \cdot s \cdot 10^{-\frac{\alpha L}{10}} \quad (3)$$

From the above, the upper limit of optical loss α before hardening the photosetting resin can be obtained in accordance with the aforementioned expression (1).

$$\alpha \leq \frac{10}{L} \log_{10} \frac{I_o \cdot s}{\sigma_A(\lambda_W)} \quad (1)$$

That is, the core with the length L (unit of cm) can be formed in a time s (unit of second) under the above conditions.

If the first photopolymerization initiator for forming the core is activated through two photon absorption, a light with longer wavelength can be employed for hardening, and the polymerization with the second photoplymerization initiator can be easily prevented.

The aforementioned manufacturing method can be also said "a method for manufacturing a self-forming optical transmission device".

Further, according to another aspect of the present invention, there is provided a method for manufacturing a self-forming optical transmission device in which a core portion with almost constant diameter is formed in a passing direction of a light flux of minute diameter, because the light flux is confined within the core portion, when forming continuously the core portion with an increased refractive index by applying the light flux of minute diameter into a photosetting resin to be hardened as aforementioned manufacturing method, to allow the core portion to reach a designed terminal area, a low refractive index structure is disposed to surround a designed formation area, so that the light flux of minute diameter is refracted due to total reflection, if getting rid of the designed formation area.

Also, in the method for manufacturing the self-forming optical transmission device, the terminal area may be a circular area, and the low refractive index structure may form an inner wall on the side face of a truncated cone with the circular area as the upper face.

Also, in the above method for manufacturing the self-forming optical transmission device, the terminal area may be a circle of radius a, and the core portion may be designed to rectilinearly advance at least from a position distance b off a center of the circle of radius a and orthogonal to the terminal area, wherein the inclination angle $\theta_m$ of the side wall of the truncated cone may satisfy the following expression, assuming that the height of the truncated cone is $L_m$, the refractive index of the core portion with almost constant diameter is $n_1$, and the refractive index of the low refractive index structure is $n_m$, $$0 < \theta_m \leq \tan^{-1} \frac{\sqrt{(b+at)^2 - 4(a - bt + L_m t)L_m t} - b - at}{2L_m t} \quad (4)$$

$$t = \tan\theta_{\max} = \tan\left(\cos^{-1}\frac{n_m}{n_1}\right)$$

Also, in the above method for manufacturing the self-forming optical transmission device, the low refractive index structure may form a part of a spheroid with a major axis as the rotation axis, the terminal area may contain one focal point of an elliptic section with the rotation axis of the spheroid as a major axis, in which the core portion is designed to advance rectilinearly at least from the other focal point.

Also in the method for manufacturing the self-forming optical transmission device, the axes of coordinates are taken in a space, and the terminal area is like a disk of radius a centered at a point (0, b/2, 0) and perpendicular to the y axis, in which the core portion is designed to advance rectilinearly at least from the position of a point (0, −b/2, 0), and assuming that the refractive index of the hardened resin portion of almost constant diameter is $n_1$, the refractive index of the low refractive index structure is $n_m$, the spheroid may be made by rotating a following ellipse with the y axis as a major axis around the y axis as the rotation axis, $$\frac{x^2}{a_0^2} + \frac{y^2}{b_0^2} = 1, z = 0 \quad (5)$$

$$a_0^2 = \frac{a^2 + a\sqrt{a^2 + b^2}}{2}$$

$$b_0 = \frac{a + \sqrt{a^2 + b^2}}{2}$$

and the following expression may bold at a point on the ellipse of the low refractive index structure, $$\cos\left\{\tan^{-1}\frac{y + \frac{b}{2}}{x} - \tan^{-1}\left(-\frac{b_0^2}{a_0^2}\frac{x}{y}\right)\right\} \leq \frac{n_m}{n_1} \quad (6)$$

Further, according to another aspect of the invention, there is provided a method for manufacturing a self-forming optical transmission device having a core portion with almost constant diameter in a passing direction of a light flux of minute diameter, because the light flux is confined within the core portion, when forming continuously the core portion with an increased refractive index by applying the light flux of minute diameter into a photosetting resin to be hardened as aforementioned, to allow the core portion to reach a designed terminal area, a reflective structure such as a metal film is disposed to surround a designed formation area, so that the light flux of minute diameter is refracted due to total reflection, when getting rid of the designed formation area.

Also, in the method for manufacturing the self-forming optical transmission device, the terminal area may be a circular area, and the reflective structure may form an inner wall on the side face of a truncated cone with the circular area as the upper face.

Also, in the method for manufacturing the self-forming optical transmission device, the terminal area may be circle of radius a, and the core portion may be designed to rectilinearly propagate at least from a position distance b off a center of the circle of radius a and perpendicular to the terminal area, in which the inclination angle $\theta_m$ of the side wall of the truncated cone satisfies the following expression, assuming that the height of the truncated cone is $L_m$.

$$0 < \theta_m \leq \tan^{-1}\left\{\frac{1}{3L_m b}\left(\sqrt[3]{\frac{s_6}{2}} - as_3 - \sqrt[3]{\frac{2}{s_6}}\right)s_2\right\} \quad (7)$$

$$s_1 = -16a^3 b^3 + 72ab^3 L_m^2 - 54a^3 L_m^3 - 54ab^2 L_m^3$$

$$s_2 = -4a^2 b^2 - 9a^2 L_m^2 + 3b^3 L_m^2$$

$$s_3 = 2b + 3L_m$$

$$s_4 = 2b - 3L_m$$

$$s_5 = 27ab^2 L_m^2 s_4 - 2a^3 s_3^3 + 9abL_m s_3(4a^2 + bL_m)$$

$$s_6 = s_1 + \sqrt{4s_2^3 + s_5^2}$$

Also, in the above method for manufacturing the self-forming optical transmission device, the reflective structure may forms a part of a spheroid with a major axis as the rotation axis, and the terminal area may contain one focal point of an elliptic section with the rotation axis of the spheroid as a major axis, in which the core portion may be designed to advance rectilinearly at least from that the other focal point.

Also, in the method for manufacturing the self-forming optical transmission device, the axes of coordinates are taken in a space, and the terminal area is like a disk with the radius a centered at a point (0, b/2, 0) and perpendicular to the y axis, in which the core portion is designed to advance rectilinearly from the position of a point (0, −b/2, 0), and the spheroid may made by rotating a an ellipse in accordance with the aforementioned expression (5), with the y axis as a major axis around the y axis as the rotation axis, $$\frac{x^2}{a_0^2} + \frac{y^2}{b_0^2} = 1, z = 0 \quad (5)$$

$$a_0^2 = \frac{a^2 + a\sqrt{a^2 + b^2}}{2}$$

$$b_0 = \frac{a + \sqrt{a^2 + b^2}}{2}$$

In the self-forming optical transmission device, the core portion grows in automatical manner along the traveling direction of light, even if the traveling light is not directed toward the designed terminal area, a structure for modifying the traveling direction of light toward the terminal area, employing the reflection of light is disposed around the designed formation area of the core portion, whereby the traveling direction can be changed toward the terminal area. At this time, if the structure has a lower refractive index than the optical transmission device, or is formed with a mirror face for reflecting the light at any angle, the objects can be accomplished. Such structure may be easily formed like a truncated cone with the terminal area on an upper plane.

Also, if a spheroid in which an ellipse is rotated around a major axis as the rotation axis, with two focal points composed of a point from which at least the core portion is designed to advance rectilinearly, namely, a point from which the reflection, convergence or dispersion of light does not occur, and a center of the terminal area, a light proceeding from the former point (first focal point) is reflected against the spheroid to travel to the latter point (second focal point), thereby producing an ideal structure.

Still further, according to another aspect of the present invention, there is provided an optical transmission and reception module comprising electrical signal input/output means for inputting or outputting a first electrical signal and a second electrical signal relevant with the first electrical signal from or to the outside, conversion means for converting the first electrical signal and the second electrical signal into a first optical signal and a second optical signal, respectively, and inversely converting the first optical signal and the second optical signal into the first electrical signal and the second electrical signal, respectively, first optical signal input/output means for inputting or outputting the first optical signal from or to an optical transmission medium, and second optical signal input/output means for inputting or outputting the second optical signal from or to the same optical transmission medium as the first optical signal at a different wavelength from the first optical signal.

With the optical transmission and reception module according to the above aspect of the invention, when transmitting a signal, the first and second electrical signals are input from the outside by electrical signal input/output means, and converted into the first and second optical signals by the conversion means, respectively. The first optical signal is input into the optical transmission medium such as optical fiber by the first optical signal input/output means, and the second optical signal is made a different wavelength from the first optical signal and input into the same optical transmission medium for the first optical signal by the second optical signal input/output means, the first and second optical signals being transmitted through the same optical transmission medium.

When receiving a signal, the first optical signal is output from the optical signal transmitted through the optical transmission medium by the first optical input/output means, and the second optical signal is output by the second optical signal input/output means. And the first and second optical signals output are inversely converted into the first and second electrical signals by the conversion means, respectively. Then, the first and second electrical signals are output to the outside by the electrical signal input/output means.

That is, in the optical transmission and reception module, to transmit the two relevant electrical signals (first and second electrical signals) input from the outside simultaneously, the first and second electrical signals are converted into first and second optical signals having different wavelengths, respectively, and entered into the same optical transmission medium, while the first and second optical signals having different wavelengths transmitted through the optical transmission medium are inversely converted into the first and second electrical signals, respectively, and output to the outside.

In this way, by optically transmitting a signal, there is no fear for the noise caused by the electromagnetic induction as will occur with the STP, and the optical transmission and reception module is applicable for the connection between remote sites.

Also, the electrical signals are employed for the input or output from or to the outside, and are converted into the optical signals within the communication device, whereby there is no need of providing the special equipment for the communications between the devices employing the conventional metal cable, resulting in the reduced costs for using this communication device.

Also, in the above optical transmission and reception module, the second optical signal input/output means preferably comprises synthesis and separation means for synthesizing two optical signals having different wavelengths that are output from the first optical signal input/output means and the second optical input/output means to input a synthesized signal into the optical transmission medium, and separating the two optical signals having different wavelengths transmitted through the optical transmission medium.

With the aforementioned optical transmission and reception module, the second optical signal input/output means uses the synthesis and separation means to synthesize the first and second optical signals having different wavelengths to enter a synthesized signal into the optical transmission medium, when transmitting a signal, while separating a signal transmitted through the optical transmission medium into the first and second optical signals, when receiving the signal. Thereby, the communications of the first and second optical signals via the same optical transmission medium can be simply provided. Such synthesis and separation means can be implemented by employing a wavelength filter, for example.

Further, there is provided the optical transmission and reception module, further comprising guide and separation means for guiding an optical signal for input into the optical transmission medium to the optical transmission medium, and separating an optical signal for output from the optical transmission medium, the guide and separation means being provided on at least one of the first optical signal input/output means and the second optical signal input/output means.

Also, the guide and separation means provided at least one of the first and second optical signal input/output means can guide an optical signal for input into the optical transmission medium from the corresponding optical signal input/output means into the optical transmission medium, when transmitting the signal, or separates the optical signal for output from the optical signal medium to output the signal, when receiving the signal.

In the optical transmission and reception module, wherein the electrical signal prefconforms to the IEEE1394 standard.

The optical transmission medium preferably can be employed as a substitute for the 1394 standard metal cable, because the electrical signals (first and second electrical signals) conform to the IEEE1394 standard.

The optical transmission and reception module preferably comprises connection means for connecting the optical signal to the optical transmission medium so that the optical signal can be input or output from or to the optical transmission medium.

In the above optical transmission and reception module, the connection means is employed to connect with the optical transmission medium so that the optical signals (first and second optical signals) can be input or output from or to the optical transmission medium. For example, when the distance between the external devices making the communications employing the communication device is changed, it is only necessary to change the optical transmission medium to the length corresponding to the changed distance.

Also, a communication device in which the optical transmission and reception module is preferably provided at either end of the optical transmission medium.

The optical transmission medium can be simply employed as a substitute for the conventional metal cable, because the optical transmission and reception module is provided at either end of the optical transmission medium, and integrally formed.

Furthermore, according to a still another aspect of the present invention, there is provided a method for forming an optical transmission device within an optical transmission and reception module for transmitting and receiving an optical signal, the optical transmission and reception module having internally a light emitting element for emitting a light beam for communication with a predetermined wavelength and a light receiving element for receiving the light beam, characterized by including introducing a light beam of a predetermined wavelength for formation of the optical transmission device into a space area for forming the optical transmission device within the optical transmission and reception module to fill a photosetting resin solution that is hardened in an optical axis direction, inserting one end of an optical fiber through a light input/output opening of the optical transmission and reception module, outputting the light beam of predetermined wavelength for communication by emitting light from the light emitting element, detecting a quantity of output light output to the outside of the transmission and reception module via the optical fiber among the light beam of predetermined wavelength for communication that is output, adjusting a light input/output axis direction of the optical fiber such that the quantity of output light is almost at maximum, and entering the light beam of predetermined wavelength for formation of the optical transmission device from the other end of the optical fiber into the optical transmission and reception module, while maintaining the adjusted light input/output axis direction of the optical fiber.

With the above aspect of the invention, the photosetting resin solution is filled in the space area for forming the optical transmission device within the optical transmission and reception module, and one end of the optical fiber is inserted through the light input/output opening of the optical transmission and reception module, and then the light emitting elements are caused to emit light. Thereby, the light beam of predetermined wavelength for communication is passed through a predetermined path within the optical transmission and reception module to proceed toward the light input/output opening to be incident upon one end face of the optical fiber, and output via the optical fiber to the outside of the optical transmission and reception module. And the light input/output axis direction of the optical fiber is adjusted so that the quantity of output light is almost at maximum, while detecting the quantity of output light.

After this adjustment, a light beam of predetermined wavelength for formation of optical transmission device is entered from the other end of the optical fiber to the optical transmission and reception module, while maintaining the adjusted light input/output axis direction of the optical fiber, so that the light beam for formation of the optical transmission device is introduced into the photosetting resin solution to form the optical transmission device, whereby the light beam can be transmitted at almost maximum efficiency in the optical transmission device formed. Accordingly, it is possible to omit the operation of making the alignment of the optical axis of the light emitting or receiving element in the optical transmission and reception module with respect to the optical transmission device formed.

Also, in the above method for forming the optical transmission device, it is preferable that the photosetting resin solution is a mixture solution of a first photosetting resin solution having a longer setting start wavelength than the predetermined wavelength and a second photosetting resin solution having a shorter setting start wavelength than the predetermined wavelength, wherein an axial core portion is formed by hardening only the first photosetting resin solution with the light beam of predetermined wavelength from the light source, and then a clad portion having a smaller refractive index than that of the core portion is formed around the core portion by applying light in a wavelength band for hardening the first and second photosetting resin solutions from around the mixture solution. Consequently, a so-called step index type optical transmission device having the core portion and the clad portion can be formed.

Also in the above method for forming the optical transmission device, it is preferable that the optical transmission device is produced in a state where one end of the optical fiber is immersed in the photosetting resin solution. Thereby, the optical transmission device is formed in a state of connecting it with one end of the optical fiber, and the optical fiber is fixed by the formed optical transmission device, without causing misalignment between the optical fiber and the optical transmission device that are coupled.

Since the optical transmission device is internally formed by the above method, the optical beam can be transmitted at almost maximum efficiency without making the alignment of optical axes for the light emitting and receiving elements after forming the optical transmission device. That is, the optical transmission and reception module with less optical loss and that is efficient can be produced simply.

Further, there is provided an optical transmission and reception module, comprising electrical signal input/output means for inputting or outputting a first electrical signal and a second electrical signal related with the first electrical signal from or into the outside, conversion means for converting the first electrical signal and the second electrical signal into a first optical signal and a second optical signal, respectively, and inversely converting the first optical signal and the second optical signal into the first electrical signal and the second electrical signal, respectively, first optical signal input/output means for inputting or outputting the first optical signal from or into an optical fiber, second optical signal input/output means for inputting or outputting the second optical signal from or into the same optical fiber for the first optical signal at a different wavelength from the first optical signal, and light propagating means having an optical transmission device formed by the above method for forming the optical transmission device between the optical fiber and the first optical signal input/output means, and between the optical fiber and the second optical signal input/output means.

With the optical transmission and reception module as described above, two relevant electrical signals (first electrical signal and second electrical signal) input from the outside are transmitted simultaneously, converted into the optical signals having different wavelengths (first optical signal and second optical signal) by the conversion means, and entered into the same optical fiber by the first optical signal input/output means and the second optical signal input/output means. Also, the optical signals having different wavelengths (first optical signal and second optical signal) transmitted via the optical fiber are inversely converted into the electrical signals (first electrical signal and second electrical signal) and output to the outside.

Thus, there is no fear for the noise caused by the electromagnetic induction by transmitting the optical signal, whereby the stable communication is enabled, irrespective of the device-to-device distance. Specifically, the optical transmission and reception module can be employed for the communication conforming to the IEEE1394 standard. Also, the electrical signals are input or output from or to the outside, and converted into the optical signals within the communication device. Therefore, the optical transmission and reception module can be applied to the communications between the devices employing the conventional metal cable, without needing any special equipment, and can be utilized without increasing the costs.

Also, the optical transmission and reception module preferably comprises the light propagating means having the optical transmission device formed by the above method for forming the optical transmission device according to the invention between the optical fiber and the first optical signal input/output means, and between the optical fiber and the second optical signal input/output means, whereby the first and second optical signals can be input or output from or into the optical fiber efficiently by the light propagating means and transmitted or received via the optical fiber to or from the outside.

In this case, it is preferable to have a so-called Pig-Tail type in which the other end of the optical fiber is extended a predetermined length from the housing of the optical transmission and reception module for the connection with the external apparatus.

Also, in the above optical transmission and reception module, it is preferable that the second optical signal input/output means comprises synthesis and separation means for synthesizing two optical signals having different wavelengths that are output from the first optical signal input/output means and the second optical signal input/output means to enter a synthesized signal into the optical fiber, and separating two optical signals having different wavelengths that are transmitted through the optical fiber.

In this way, the second optical signal input/output means comprises the synthesis and separation means to synthesize the first optical signal and the second optical signal that have different wavelengths to be input into the optical fiber, when transmitting the signal, or separate the synthesized signal transmitted through the optical fiber into the first optical signal and the second optical signal in receiving the signal. Accordingly, the communications of the first optical signal and the second optical signal via the same optical fiber can be simply provided. This synthesis and separation means can be implemented employing the wavelength filter, for example.

Also, the above optical transmission and reception module preferably further comprises guide and separation means for guiding an optical signal for input into the optical fiber to a light transmission medium and separating an optical signal for output from the optical fiber, the guide and separation means being provided on at least one of the first optical signal input/output means and the second optical signal input/output means.

Thereby, owing to the guide and separation means provided on at least one of the first optical signal input/output means and the second optical signal input/output means, the optical signal for input into the optical fiber that is passed from the corresponding optical signal input/output means is guided into the optical fiber, when transmitting the signal, or the optical signal for output from the optical fiber is separated and output (received), when receiving the signal. Accordingly, the optical signal for input can be entered into the optical fiber efficiently, and the optical signal for output from the light transmission medium can be received efficiently by the output section, reducing the optical loss (LOSS).

Features and advantages of the invention will be evident from the following detailed description of the preferred embodiments described in conjunction with the attached drawings.

BRIEF DESCRIPTION OF THE DRAWINGS

In the accompanying drawings:

FIG. 4A is a cross-sectional view showing a structure of a light transmission line according to a third embodiment of the present invention, and FIG. 4B is an enlarged view of the structure S;

FIG. 23 is a constitution view of a metal cable conforming to the IEEE1394 standard.

DETAILED DESCRIPTION OF THE PREFERRED EMBODIMENTS

Figure 1:
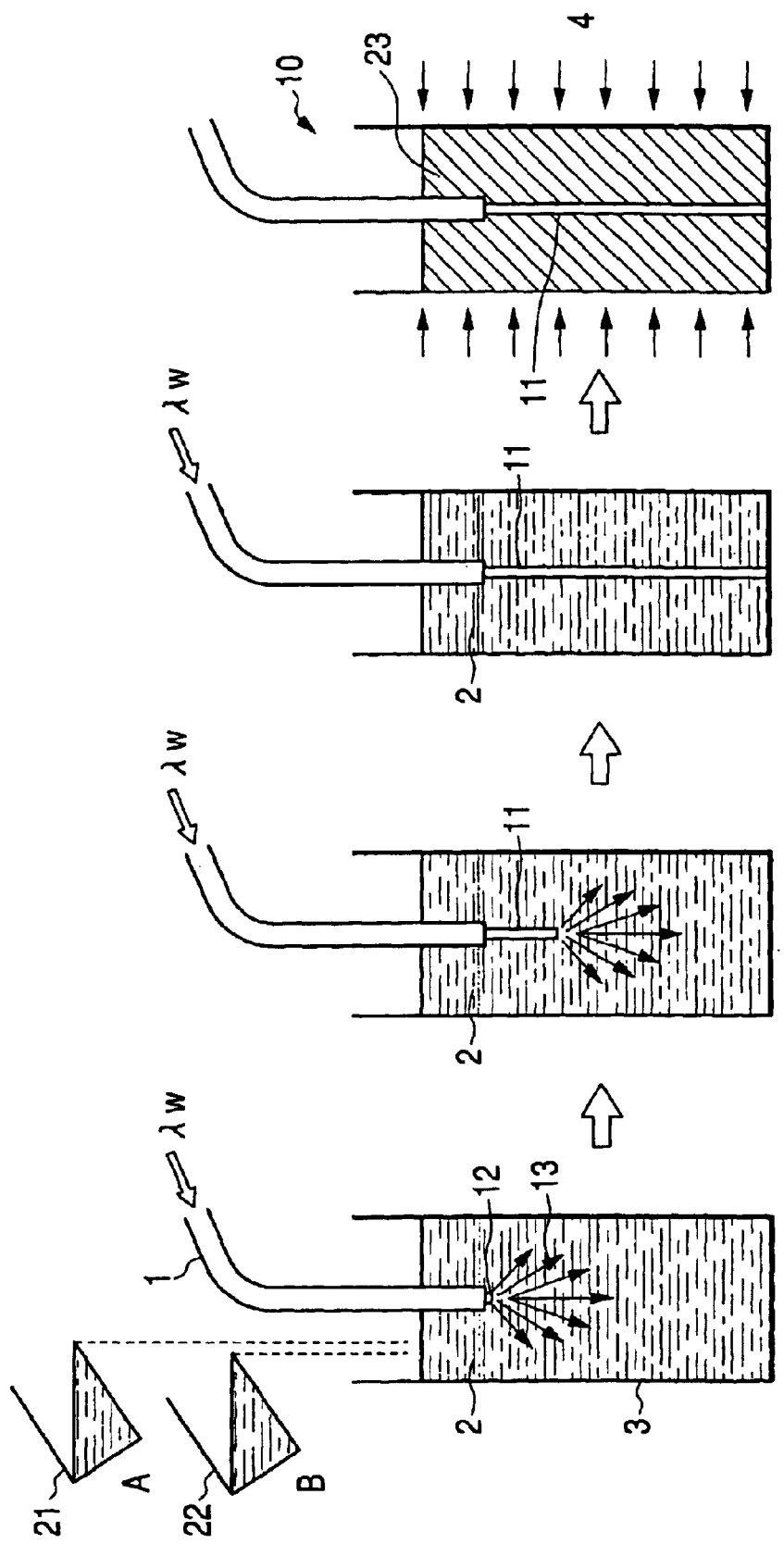
FIG. 1 is a process view showing a method for manufacturing an optical transmission device according to a first embodiment of the invention.

The suitable photopolymerization initiators and monomers or oligomers that can be employed for the method for manufacturing the optical transmission device according to the present invention are listed below.

The monomers for effecting radical photopolymerization preferably include (meta)acrylic ester and (meta)amide acrylate. Specifically, one functional (meta)acrylic ester (mono(meta)acrylate) can be employed, such as (meta)acrylate 2-ethylhexyl, (meta)acrylate cyclohexyl, and (meta)acrylate 2-butoxyethyl. Also, ester (di(meta)acrylate) between diol such as ethylene glycol, neopentyl glycol, or 1,6-hexanediol, and 2 isosteric (meta)acrylic acid can be employed. Similarly, ester (tri, tetra, . . . , (meta)acrylate) between organic compound having alcohol hydroxyl groups and (meta)acrylic acid can be also employed. In these monomers, (meta)acryloyl radical and other organic skeleton methyl hydrogen, methylene hydrogen, or methyne hydrogen partially substituted by halogen may be employed.

As the oligomer (macro-monomer) for effecting radical photopolymerization, urethane oligomer, polyether oligomer, epoxy oligomer, and polyester oligomer having (meta)acryloyl radical at the termination or branch are preferable. In these oligomers, (meta)acryloyl radical and other organic skeleton methyl hydrogen, methylene hydrogen, or methyne hydrogen partially substituted may be employed.

Examples of the radical photopolymerization initiator are benzyldimethylketal compounds including 2,2-dimethoxy-2-phenylacetophenone, α-hydroxyketon compounds including 2-hydroxy-2-methyl-phenylpropane-1-on, and (1-hydroxycyclohexyl)-phenylketon, α-aminoketon compounds including 2-benzyl-2-dimethylamino-1-(4-morpholinophenyl)-butane-1-on, 2-methyl-1-(4-(methyltio)phenyl)-2-morpholinopropane-1-on, bisacylphosphineoxide compounds including bis(2,6-dimetoxybenzoil-2,4,4-trimethyl-pentylphosphineoxide, bis(2,4,6-trimethylbenzoil)-phenylphosphineoxide, metallocene compounds including bis(η-cyclopentadienyl)-bis(2,6-difluoro-3-(N-pyroyl)phenyl)titan. A plurality of kinds of them may be combined.

Examples of the monomer or oligomer for effecting cationic photopolymerization include epoxy ring, oxetane ring, cyclic ether compound, cyclic lactone compound, cyclic acetal compound, and vinyl ether compound.

Examples of the cationic photopolymerization initiator include 4,4'-bis(di(2-hydroxyethoxy)phenylsulfonio) phenylsulfidedihexyfluoroantimonate, and η-cyclopentadienyl-η-cumene iron(1+)-hexafluorophosphoric acid(1−).

A photosensitizer may be added to the radical photopolymerization initiator or cationic photoplymerization initiator as above cited. By the above combination, a photosetting liquid resin composition may be formed. Also, the invention does not exclude the combination between the polymerization initiator for anion photopolymerization and the monomer or oligomer. Also, the polymerization with the addition of thiol salt may be employed. The core portion may be made by light irradiation in the same manner as in the invention, and the clad portion may be made by other way than light irradiation.

First Embodiment

FIG. 1 shows a method for manufacturing an optical transmission device in a first embodiment of the invention. An optical fiber 1, a mixture solution (photosetting liquid resin composition) 2 of the photosetting resins 21 and 22 polymerizing in two different polymerization types, and a transparent container 3 were prepared. For the photosetting resins 21 and 22 polymerizing in two different polymerization types, the product number 358 (hereinafter referred to simply as a resin A) manufactured by Loctite Inc. to make radical photopolymerization and the product number UV-2100 (hereinafter referred to simply as a resin B) manufactured by Dykin Inc. to make cationic photopolymerization were employed.

As shown in FIG. 1A, the resin A 21 and the resin B 22 were mixed (with a weight ratio of 7:3) to prepare the mixture solution 2, which was then filled in the transparent container 3. Then, a tip end face 12 of the optical fiber 1 was dipped into the mixture solution 2, and a light having a wavelength $\lambda_w=488$ nm was supplied to the optical fiber 1. Then, a hardened resin 11 (core portion) of almost truncated cone shape was formed from the tip end face 12 of the optical fiber 1 as shown in FIG. 1B. Thereafter, the hardened portion 11 grew to be of an almost cylindrical shape with a constant diameter (FIG. 1C). When the hardened resin 11 reached about 23 cm in length, the light having wavelength $\lambda_w=488$ nm was stopped to supply, and a light having a wavelength $\lambda_c=385$ nm (indicated by 4 in the figure) was supplied from around the transparent container 3 to harden the mixture solution 2 remaining in the transparent container 3 completely (FIG. 1D).

The refractive indexes of the hardened portion 11 as an optical transmission line and other hardened portion 23 (cladportion) within the transparent container 3 were measured as 1.511 and 1.499 for the light having a wavelength of 385 nm, respectively. The refractive index of the hardened portion 11 was equal to that of the resin A after being hardened, and the refractive index of the hardened portion 23 was an intermediate value between those of the resin A and the resin B after being hardened. Hence, the resin A in the mixture solution 2 was only hardened by irradiation of the light having wavelength $\lambda_w=488$ nm to form a long core portion of almost cylindrical shape and with high refractive index. Then, each of the resin A and the resin B was hardened by irradiation of the light having wavelength $\lambda_c=385$ nm to form a clad portion with low refractive index, whereby the optical transmission device 10 could be formed.

Figure 2:
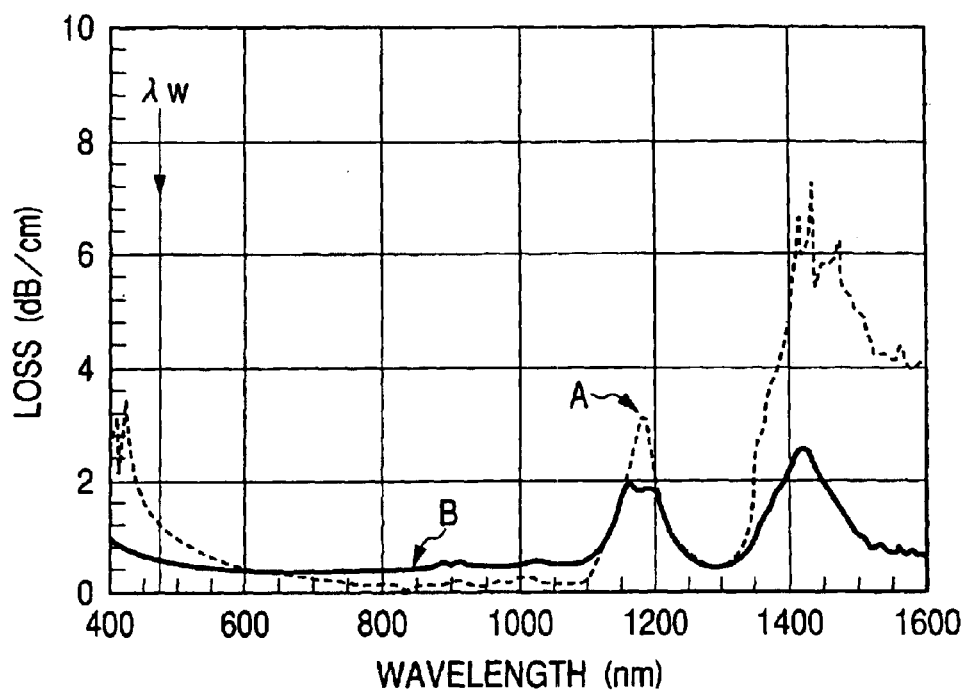
FIG. 2 is a wavelength characteristic curve of absorbance for explaining a principle of the method for manufacturing the optical transmission device according to the first embodiment of the invention.

The results of this experiment can be explained in the following way. FIG. 2 shows a wavelength characteristic of the absorbance (optical loss, unit of dB/cm) before hardening the resins A and B. At a wavelength $\lambda_w=488$ nm, the absorption characteristics for the resins A and B are greatly different. This means that the wavelengths for activating the photopolymerization initiators for two kinds of photosetting resins are different. In this way, employing two kinds of photosetting resins that are not copolymerized and have different activation wavelengths of the photopolymerization initiators for hardening, the core portion can be only formed by hardening the photosetting resin with higher refractive index under the intermediate wavelength between two wavelengths, if the activation wavelength of the photopolymerization initiator of the photosetting resin with higher refractive index after hardening is longer than the activation wavelength of the photopolymerization initiator of the photosetting resin with lower refractive index after hardening. Thereafter, two kinds of photosetting resins that become the clad portion are hardened to form the optical transmission device.

Second Embodiment

In this second embodiment, like the first embodiment, an optical transmission device was made by forming a core and a clad by different amounts of exposure. As shown in FIG. 1A, the resin A 21 and the resin B 22 were mixed to prepare a mixture solution (photosetting liquid resin composition) 2, which was then filled in the transparent container 3. Then, a tip end face 12 of the optical fiber 1 was dipped into the mixture solution 2, and a light having a wavelength $\lambda_w=385$ nm was supplied to the optical fiber 1 to have an amount of exposure of 30 mJ/cm$^2$ (indicated by 13 in the figure) at the tip end face 12. Then, a hardened resin 11 (core portion) of almost truncated cone shape was formed from the tip end face 12 of the optical fiber 1 as shown in FIG. 1B. Thereafter, the hardened portion 11 grew to be of an almost cylindrical shape with a constant diameter (FIG. C). When the hardened resin 11 reached about 23 cm in length (with an amount of exposure of 30 mJ/cm$^2$, the light was stopped to supply, and a light having a wavelength $\lambda_w=385$ nm was applied with an amount of exposure of 60 mJ/cm$^2$ (indicated by 4 in the figure) from around the transparent container 3 to harden the mixture solution 2 remaining in the transparent container 3 completely (FIG. 1D).

The refractive indexes of the hardened portion 11 as an optical transmission line and other hardened portion 23 (cladportion) within the transparent container 3 were measured as 1.511 and 1.499 for the light having a wavelength of 385 nm, respectively. The refractive index of the hardened portion 11 was equal to that of the resin A after being hardened, and the refractive index of the hardened portion 23 was an intermediate value between those of the resin A and the resin B after being hardened. Hence, the resin A in the mixture solution 2 was only hardened by irradiation of the light having wavelength $\lambda_w=385$ nm and with an amount of exposure of 30 mJ/cm$^2$ to form a long core portion of almost cylindrical shape and with high refractive index. Then, each of the resin A and the resin B was hardened by irradiation of the light having wavelength $\lambda_c=385$ nm and with an amount of exposure of 60 mJ/cm$^2$ to form a clad portion with low refractive index, whereby the optical transmission device 10 could be formed.

Figure 3:
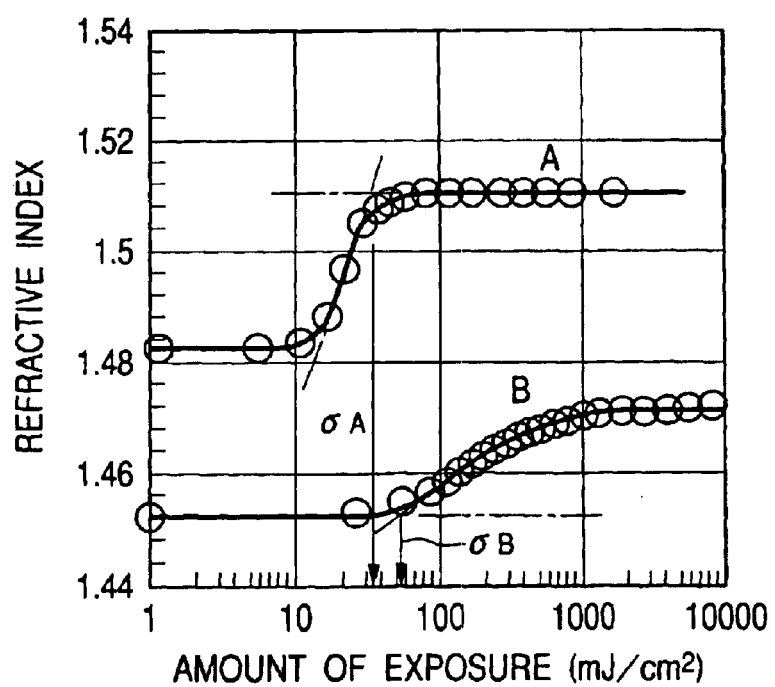
FIG. 3 is a graph showing the refractive index relative to the amount of exposure for explaining a principle of the method for manufacturing the optical transmission device according to a second embodiment of the invention.

The results of this experiment can be explained in the following way. FIG. 3 shows a relation between the amount of exposure and the refractive index that was examined by applying a light having wavelength $\lambda_c=385$ nm to each of the resins A and B separately. The resin A has a refractive index reaching substantially the utmost with an amount of exposure of 30 mJ/cm$^2$ (fully hardened), but the resin B has a refractive index almost less increasing up to an amount of exposure of 60 mJ/cm$^2$. This is due to the fact that the sensitivities of the photopolymerization initiators for the resins A and B (or sensitivities owing to the interaction between the photopolymerization initiators and the photosensitizer) are different. In this way, employing two kinds of photosetting resins that are not copolymerized and have different amounts of exposure for hardening, the core can be only formed by hardening the photosetting resin with higher refractive index after hardening due to a difference between two amounts of exposure, if the minimum amount of exposure for hardening completely the photosetting resin with higher refractive index. after hardening is less than the maximum amount of exposure for not hardening the photosetting resin with lower refractive index. Thereafter, two kinds of photosetting resins that become the clad are hardened to form the optical transmission device.

While in the above embodiments, two resins A and B were employed, in the invention a photosetting liquid resin composition may be used in which a core formation resin (only one) and a clad formation resin (two kinds of mixtures) are selected from any combination of two photosetting resins that are not copolymerized. Employing a difference between the hardening wavelengths or amounts of exposure required for hardening two resins in this photosetting liquid resin composition, the core portion is only formed by hardening the core formation resin of the photosetting liquid resin composition, and then the clad portion is formed by hardening the remaining portion. At this time, the polymerization types of two photosetting resins that are not copolymerized are not limited to the radical photopolymerization and the cationic photopolymerization.

As aforementioned, though the optical transmission device is subjected to so-called "self-formation", the precision of arranged optical parts determines the position of the self-forming optical transmission device, whereby if the precision of arranged optical parts is poor, the optical transmission device is not formed at the desired position, so that there is the possibility that the optical transmission device might not reach the photoelectric conversion element arranged. That is, if the tip end of the optical fiber 991 is minutely shifted in the angle, a core portion 9211 does not reach the photoelectric conversion element 995 (desired terminal area) in a clad portion 923 in a transparent container 993, as shown in FIG. 23A. Also, even when the half mirrors 961, 962 and a reflection mirror 963 are disposed to provide a branch point and an inflection point, as shown in FIG. 23B, core portions 9211a, 9211b and 9211c may not reach the photoelectric conversion elements 995a, 995b and 995c (desired terminal area), if these mirrors 961, 962 and 963 are not aligned correctly.

The next embodiment is directed to the above possible problem.

Third Embodiment

FIG. 4A is a cross-sectional view showing the constitution of an optical module which has an optical transmission device according to a third embodiment of the present invention. Note that the portion without slanting lines is not a void. A portion indicated at S is a structure of this embodiment, and shown in an enlarged view of FIG. 4B. The structure S is provided in a transparent container 203 with a refractive index $n_m$, and the half mirrors 261, 262 and a reflection mirror 263 are disposed. An optical transmission line 211 as a core portion is formed from a mixture resin solution by applying light through an optical fiber 201, with the branches 211a, 211b and 211c formed, as the first and second embodiments. In this case, the structure is provided at each of three positions so that the branches 211a, 211b and 211c can reach desired photoelectric conversion elements 205a, 205b and 205c, respectively. The reference numeral 223 denotes a hardened portion as a clad portion.

Figure 5A:
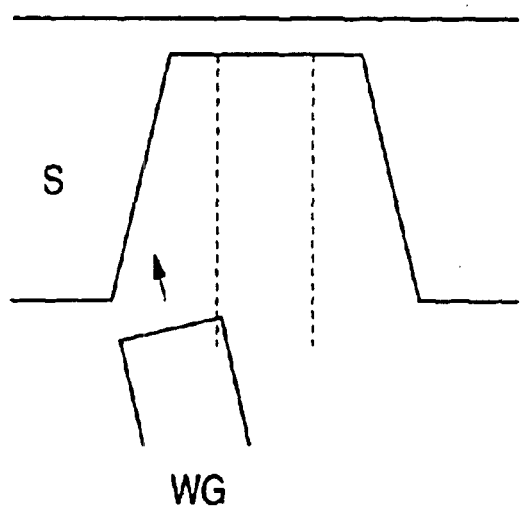
FIG. 5 is a step view showing the growth of a self-forming optical transmission device according to the third embodiment of the invention.
Figure 5B:
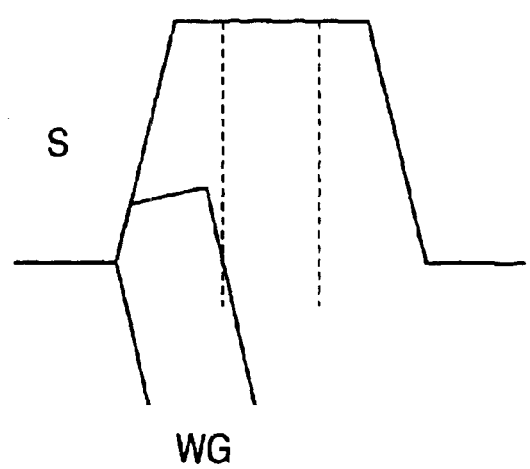
Figure 5C:
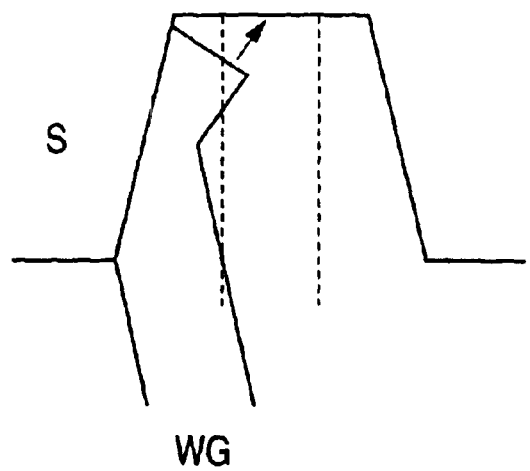

Even though the optical transmission line WG (hardened resin portion, core portion) grows deviated from the designed bearing (an area enclosed by two dotted lines) as shown in FIG. 5A, light is reflected against the optical transmission line WG, as shown in FIG. 5B, so that the optical transmission line WG (hardened resin portion) grows in a direction as shown in FIG. 5C, thereby being modified in the desired bearing (area enclosed by two dotted lines). In order that the light may be reflected against the structure portion, a metal film, for example, may be made to form the mirror, or the refractive index $n_m$ of the constituent material of the structure may be smaller than the refractive index $n_1$ of the optical transmission line WG, and the inclination of wall face is made so that the angle of incidence can meet the total reflection condition.

First Example of Structure

Figure 6:
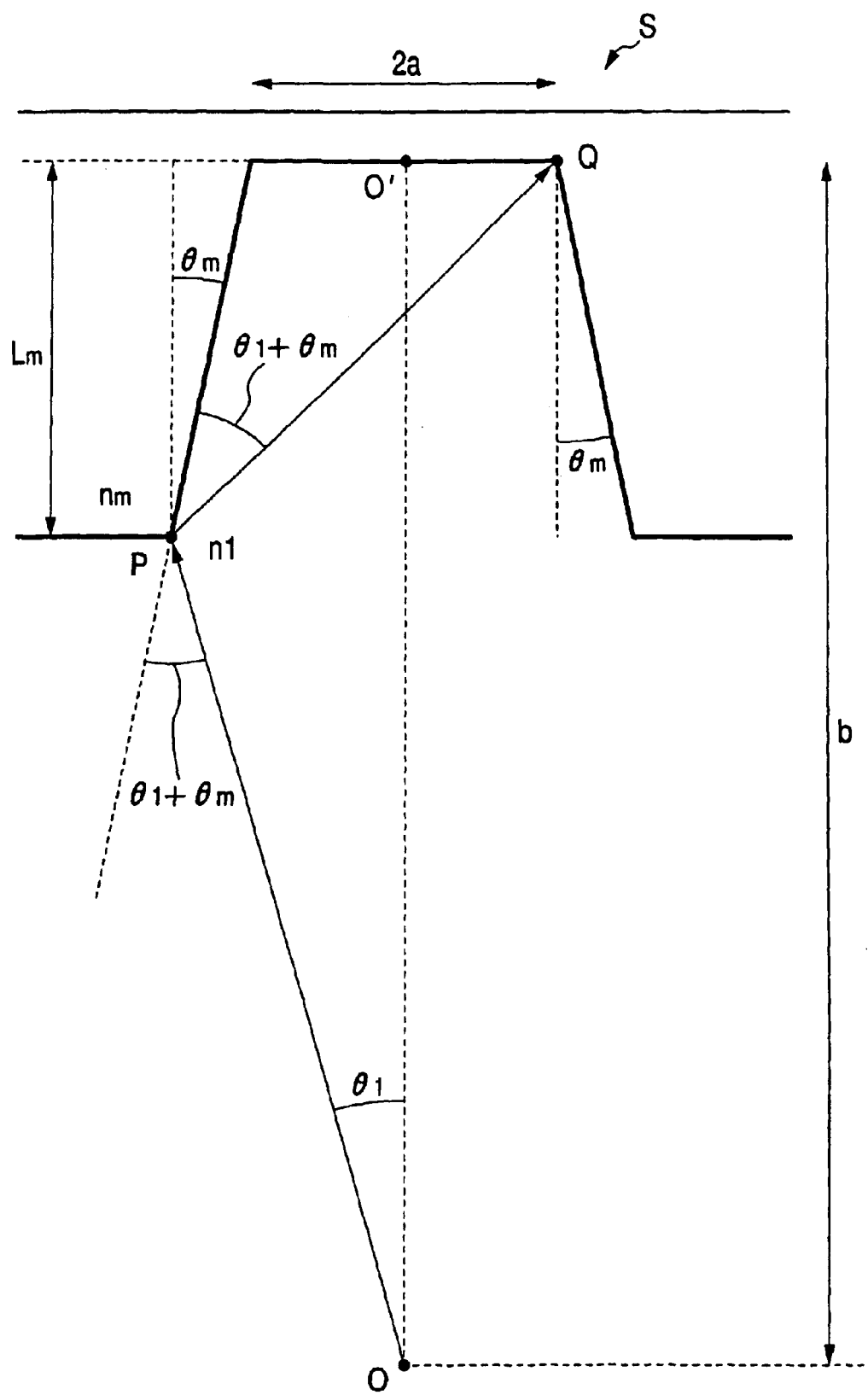
FIG. 6 is a design view showing a first or second structure in the third embodiment, of which the wall face is the side face of a truncated cone.

In the case where the refractive index $n_m$ of the constituent material of the structure is smaller than the refractive index $n_1$ of the optical transmission line WG, and the inclination of wall face is made so that the angle of incidence can meet the total reflection condition, the terminal area is like a circle with the radius a, and light is incident from a point O the distance b off the center O' of the circle perpendicularly to the circle, and the structure is designed to have a wall face on the side face of a truncated cone with the terminal area as the upper face (FIG. 6). Assume that the height of the truncated cone is $L_m$, and the angle made by the incident light direction with respect to the wall face is $\theta_m$.

Consider that a light from the point O is incident upon a point P on the circumference around a bottom face of the truncated cone. Assuming that the angle made between OO' and OP is $\theta_1$, the angle made by OP with respect to the bottom face of the truncated cone is equal to $\theta_1 + \theta_m$. The distance between the point P and the line segment OO' is represented in two ways, and their values are equalized as follows.

$$(b-L_m)\tan\theta_1 = a + L_m \tan\theta_m \qquad (8)$$

On the other hand, when a light passing OP advances through the optical transmission line with the refractive index $n_1$, the total reflection condition of the structure with the refractive index $n_m$ at point P is such as:

$$\theta_1 + \theta_m \leq \cos^{-1}\frac{n_m}{n_1} = \theta_{max} \qquad (9)$$

From the above, the following expression holds.

$$\tan^{-1}\left(\frac{a + L_m \tan\theta_m}{b - L_m}\right) + \theta_m \leq \theta_{max} \qquad (10)$$

Solving this expression, the following inequality results.

$$L_m \tan\theta_{max} \tan^2\theta_m + (b+a\tan\theta_{max})\tan\theta_m - (b-L_m)\tan\theta_{max} + a \leq 0 \qquad (11)$$

The inclination angle $\theta_m$ of the side wall can satisfy the expression (4) aforementioned, and thus meet the total reflection condition.

$$0 < \theta_m \leq \tan^{-1}\frac{\sqrt{(b+at)^2 - 4(a-bt+L_m t)L_m t} - b - at}{2L_m t} \qquad (4)$$

$$t = \tan\theta_{max} = \tan\left(\cos^{-1}\frac{n_m}{n_1}\right)$$

In the case where a light from the point O is incident upon a point on the side wall of the truncated cone other than the point P on the circumference around the bottom face of the truncated cone, it is clear that the angle of incidence is smaller than the angle of incidence at the point P. Hence, the numerical expression (4) holds, whereby the total reflection condition is met at any point on the side wall of the truncated cone.

Figure 7:
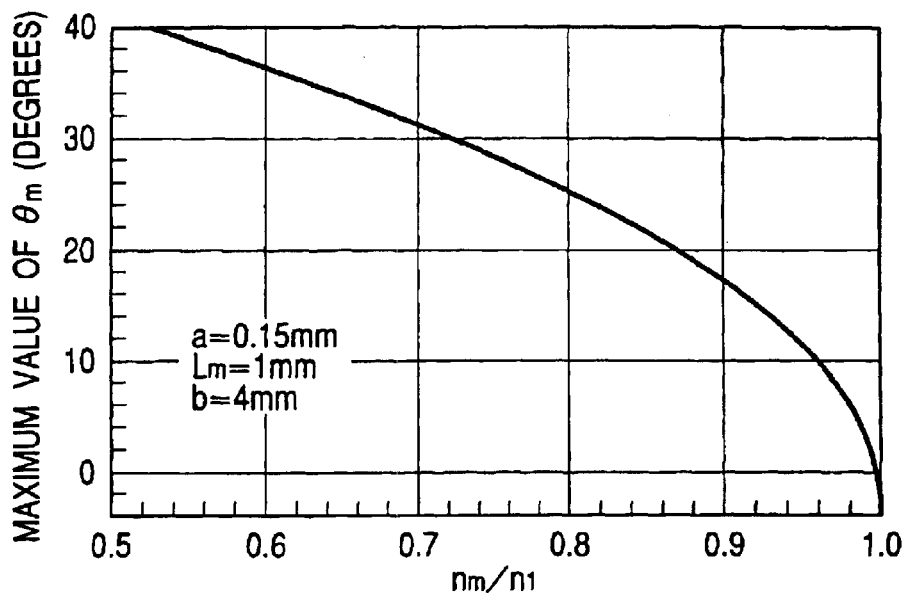
FIG. 7 is a graph of simulation in the first structure example.
Figure 8:
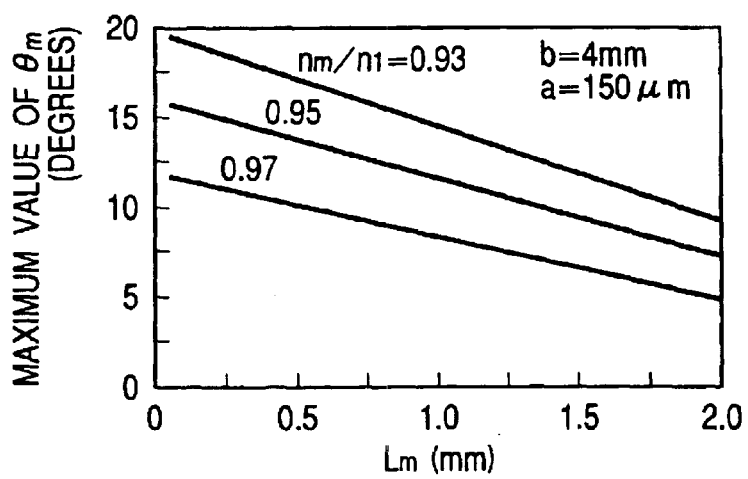
FIG. 8 is a graph of another simulation in the first structure example.

FIG. 7 is a graph in which the left side of numerical expression (4) (maximum value of $\theta_m$) is simulated with the refractive index ratio $n_m/n_1$. Herein, a, b and $L_m$ are equal to 0.15 mm, 4 mm, and 1 mm, respectively. With this simulation, it is required that the refractive index ratio $n_m/n_1$ is 0.96, and the inclination angle of the side wall of the truncated cone is 10 degrees or less. FIG. 8 shows a relation between the Lm and the left side of numerical expression (4) (maximum value of $\theta_m$), when the refractive index ratio $n_m/n_1$ is 0.93, 0.95, and 0.97, where a is equal to 0.15 and b is equal to 4 mm.

Second Example of Structure

In the first structure in which a reflective film made of metal is formed on the side wall of the truncated cone, the following condition can be provided. Namely, the condition is set up such that light may reach the terminal area with the radius a by one reflection.

In FIG. 6, suppose that a light incident from the point I reaches the point P on the circumference around the bottom face of the truncated cone, and is reflected to get to the point Q on the outer circumference in the terminal area. It will be easily understood that when light from the point O is incident upon a point on the side wall of the truncated cone other than the point P on the circumference around the bottom face of the truncated cone, the angle of reflection is so small that the light can reach the terminal area without reflection at the second time.

In order to meet such condition, it is necessary that the following relation holds.

$$L_m \tan(\theta_1 + 2\theta_m) \leq L_m \tan \theta_m + 2a \quad (12)$$

Expanding the expression (12) using the numerical expression (8), the following results.

$$b\tan^3\theta_m + \left(\frac{2ab}{L_m} + 3a\right)\tan^2\theta_m + \left(b + \frac{4a^2}{L_m}\right)\tan\theta_m + \left(3a - \frac{2ab}{L_m}\right) \leq 0 \quad (13)$$

Figure 9:
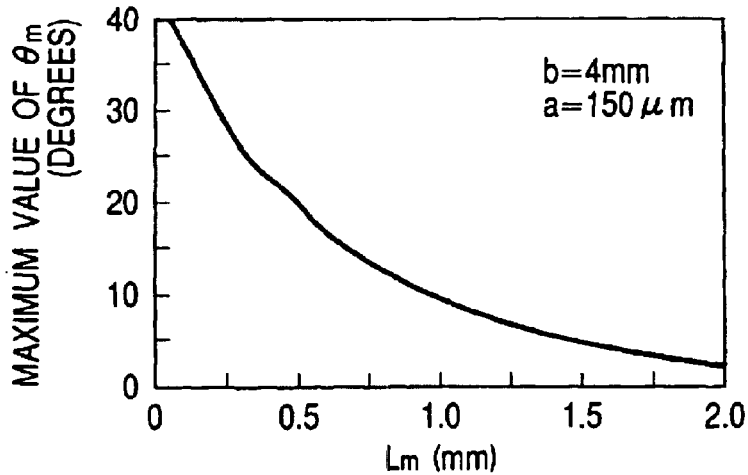
FIG. 9 is a graph of simulation in the second structure example.

The numerical expression (13) has one real solution. If this solution is positive (if $3L > 2b$, the real solution is positive), its solution is the maximum value of $\theta_m$. In practice, the maximum value of $\theta_m$ can be calculated in the expression (7) aforementioned. Hence, assuming that a is equal to 0.15 mm and b is equal to 4 mm, the relation between $L_m$ and the solution of the numerical expression (13) (maximum value of $\theta_m$) is shown in FIG. 9.

$$0 < \theta_m \leq \tan^{-1}\left\{\frac{1}{3L_m b}\left(\sqrt[3]{\frac{s_6}{2}} - as_3 - \sqrt[3]{\frac{2}{s_6}}\right)s_2\right\} \quad (7)$$

$$s_1 = -16a^3b^3 + 72ab^3L_m^2 - 54a^3L_m^3 - 54ab^2L_m^3$$

$$s_2 = -4a^2b^2 - 9a^2L_m^2 + 3b^2L_m^2$$

$$s_3 = 2b + 3L_m$$

$$s_4 = 2b - 3L_m$$

$$s_5 = 27ab^2L_m^2 s_4 - 2a^3s_3^3 + 9abL_m s_3(4a^2 + bL_m)$$

$$s_6 = s_1 + \sqrt{4s_2^3 + s_5^2}$$

Third Example of Structure

Figure 10:
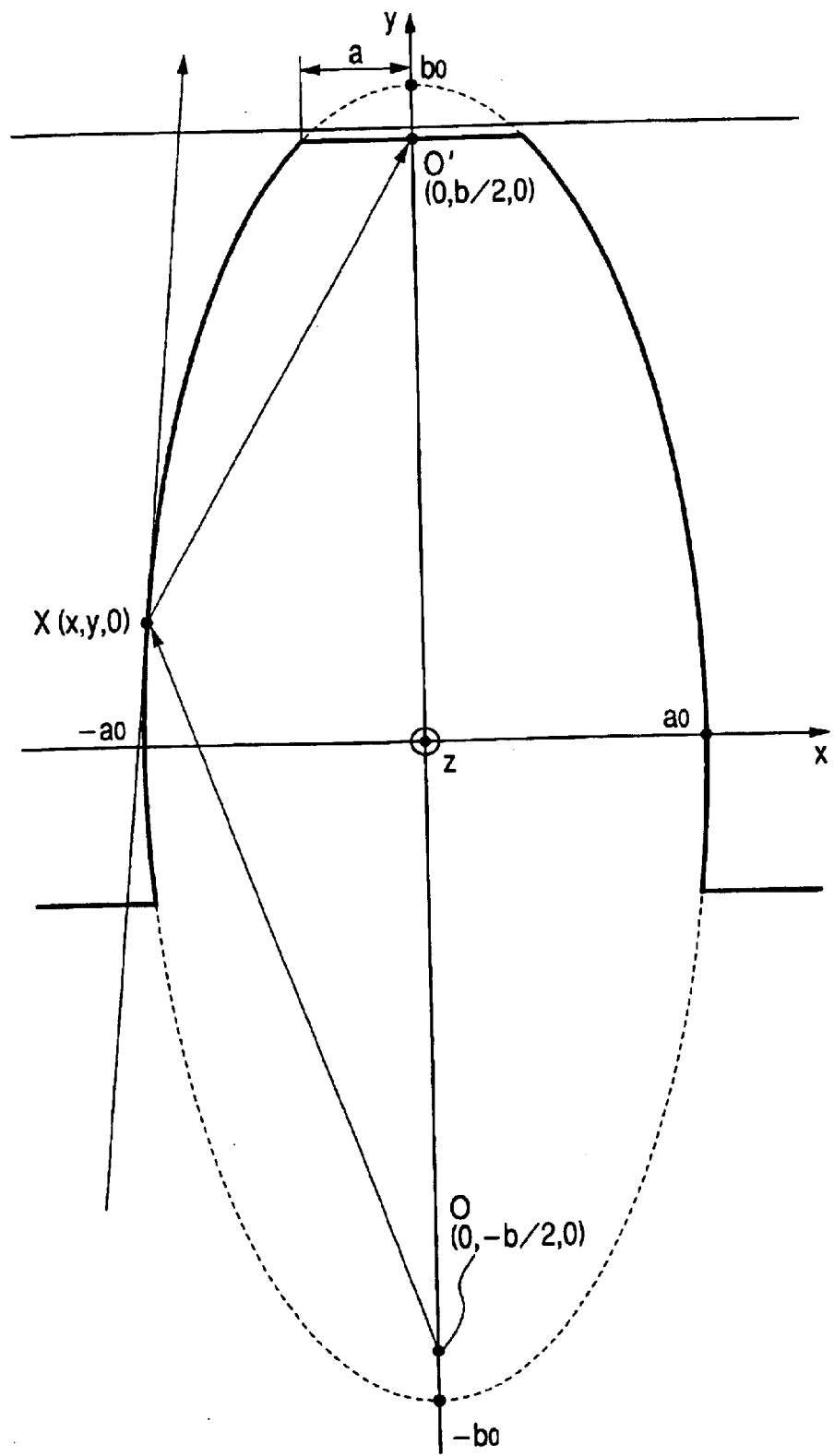
FIG. 10 is a design view a third or fourth structure in the third embodiment, of which the wall face is the face of a spheroid.

In a structure having the spheroid in which an ellipse with the focal points at the point O (light emitting point) and the point O' (center in the terminal area) is rotated around the major axis, with a metal film on the wall face, a light from the point O is reflected to the point O' (see FIG. 10). Assuming that two focal point O (light emitting point) and O' (center in the terminal area) are Cartesian coordinates (0, −b/2, 0) and (0, b/2, 0), respectively, the ellipse passing through the point (a, b/2, 0) is represented in the expression aforementioned (5) (see FIG. 10).

$$\frac{x^2}{a_0^2} + \frac{y^2}{b_0^2} = 1, z = 0 \quad (5)$$

$$a_0^2 = \frac{a^2 + a\sqrt{a^2 + b^2}}{2}$$

$$b_0 = \frac{a + \sqrt{a^2 = b^2}}{2}$$

The spheroid in which the ellipse satisfying the numerical expression (5) is rotated around the y axis reflects the light from one focal point (0, −b/2, 0) upon the spheroid, and led to the other focal point (0, b/2, 0) (center in the terminal area).

Fourth Example of Structure

For a fourth structure having the spheroid of the third structure, and having no metal film, unlike the first structure, the total reflection condition with the refractive index is obtained. The angle of the tangential line (positive direction reference of the x axis, counterclockwise) at the coordinates (x, y, 0) on the ellipse of numerical expression (5) is as follows.

$$\tan^{-1}\left(-\frac{b_0^2}{a_0^2}\frac{x}{y}\right) \quad (14)$$

The angle of the vector OX with respect to the positive direction of the x axis is such as:

$$\tan^{-1}\frac{y + \frac{b}{2}}{x} \quad (15)$$

From the above, the condition for the angle (counterclockwise) of the vector OX with respect to the tangential line to satisfy the Snell's law is the aforementioned expression (6).

$$\cos\left\{\tan^{-1}\frac{y + \frac{b}{2}}{x} - \tan^{-1}\left(-\frac{b_0^2}{a_0^2}\frac{x}{y}\right)\right\} \leq \frac{n_m}{n_1} \quad (6)$$

In the above embodiment, for the simplicity, the structure of the invention has been described with an optical path from one point. However, since the self-forming optical transmission line of the invention has a constant diameter, the structure may be designed in accordance with that diameter. Namely, it is not difficult to design the structure such that the light flux from a certain area can reach the terminal area. It suffices that a light radiation point O is a point of notice, such as a tip end face of optical fiber or a design point of mirror, from which the self-forming optical transmission line can reach the terminal area where the photoelectric conversion element is disposed without obstacle.

In the above embodiment, the truncated cone and the spheroid are employed. However, the structure of the invention may be constructed by the wall face of any polyhedron or any curved surface. In this case, the structure not only expands from the terminal area to the point of notice, as will be apparent from FIG. 10, but also may be a curved surface or polyhedron having a narrowed portion. In some cases, this structure may take a shape of an inverse truncated cone as a whole or partially to practice this invention.

Fourth Embodiment

A fourth embodiment of the present invention will be described below with reference to the accompanying drawings.

Figure 11:
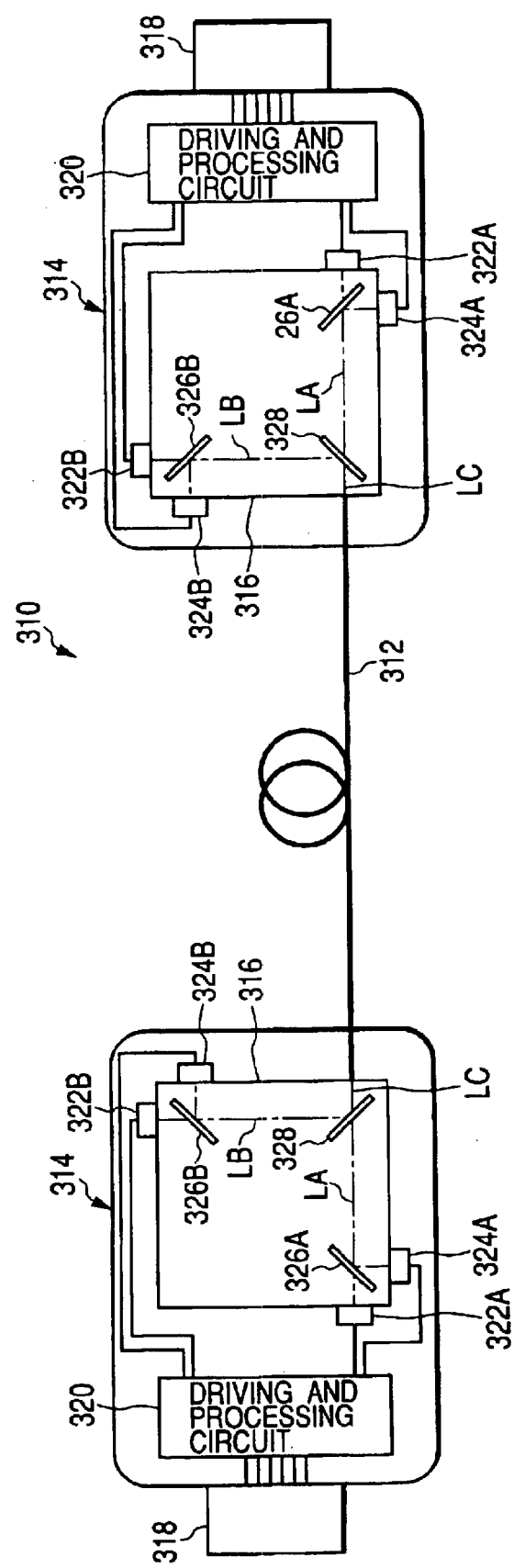
FIG. 11 is a constitution view of a communication cable according to a fourth embodiment of the present invention.

A communication cable 310 for a communication device of the present invention has an optical transmission and reception module 314 connected to either end of an optical fiber 312 as an optical transmission medium, as shown in FIG. 11.

This invention does not restrict the optical fiber 312 in the polarization plane dependency. In this embodiment, a cheap POF (Plastic Optical Fiber) is employed. Naturally, the fiber having the polarization plane dependency may be used.

Each transmission and reception module 314 is connected with an end face of the optical fiber 312. Also, each transmission and reception module 314 comprises an input/output module 16 for inputting or outputting an optical signal from or to the end face of the optical fiber 312, a connector 318 as electric signal input/output means to be connected to an external apparatus, and a driving and processing circuit 320 as conversion means.

The input/output module 316 has two pairs of light emitting elements (LD) 322 and light receiving elements (PD) 324 as first and second optical signal input/output means. In the following, one pair is referred to as a light emitting element 322A and a light receiving element 324A, and the other pair is referred to as a light emitting element 322B and a light receiving element 324B.

The light emitting elements 322A, 322B emit light beams LA, LB having different wavelengths $\lambda 1$, $\lambda 2$, respectively. Specifically, in this embodiment, the light emitting element 322A emits a light beam LA having a wavelength $\lambda 1$ of 650 nm, and the light emitting element 322B emits a light beam having a wavelength $\lambda 2$ of 520 nm. This is because the typical POF has a wavelength band (so-called a window) with low optical loss at 650 nm and in a range from 550 to 470 nm.

Each of the light receiving elements 324A, 324B receives a light beam incident upon a light receiving plane and outputs an electric signal corresponding to the quantity of received light. This electric signal is hereinafter referred to as a light receiving signal.

In the traveling direction of light beams LA, LB output from the light emitting elements 322A, 322B, the beam splitters 326A, 326B are disposed as guide means, respectively. The beam splitters 326A, 326B transmit a predetermined quantity of light and reflect a predetermined quantity of light among the light beams LA, LB, so that the transmitted light quantity and the reflected light quantity may be at a certain division ratio. (e.g., 1:1). The beam splitters 326A, 326B may have a function of deflecting optics such as a deflecting beam splitter to regulate the ratio between the transmitted light and the reflected light at will.

In the traveling direction of the light beams LA and LB passing through the beam splitters 326A, 326B, and at a position where the optical paths of the light beams LA and LB intersect, a wavelength filter 328 for transmitting a light beam having a predetermined wavelength and reflecting a light beam having another predetermined wavelength is disposed as synthesis and separation means. More particularly, the wavelength filter 328 transmits the light beam LA having the wavelength $\lambda 1$, and reflects the light beam LB having the wavelength $\lambda 2$, to synthesize the light beams LA and LB.

The light beam synthesized by this wavelength filter 328 is incident upon the end face of the optical fiber 12, which then transmits the incident light beam in a direction toward the other end.

For instance, a condenser lens may be placed on the optical path of the light beam for the input/output module 316 to condense the light beam to be incident upon the optical fiber 312, or a collimator lens may be placed to make the light beams parallel to be incident upon the optical fiber 312 as a light flux parallel to the optic axis of the optical fiber, reducing the optical loss at the end face of the optical fiber 312.

On one hand, a light beam input from the optical fiber 312 into the input/output module 316 is incident upon the wavelength filter 328, which transmits the light beam LA having the wavelength $\lambda 1$ to proceed in a direction toward the beam splitter 326A and reflects the light beam LB having the wavelength $\lambda 2$ to proceed in a direction toward the beam splitter 326B.

The light beams LA and LB are reflected at a predetermined quantity of light, for example, at a division ratio of 1:1, by the beam splitters 326A and 326B, and guided toward the light receiving elements 324A and 324B to be incident upon the light receiving plane of the light receiving elements 324A. and 324B. In the case where there is no need of considering the lower communication stability due to the optical loss, both or one of the light receiving elements may be arranged side by side with the light emitting elements to be paired in accordance with, for example, the output light quantity of the light emitting element or the significance of the transmitting signal, thereby omitting the beam splitters.

The connector 318 is connectable to the input/output terminal on the side of the external device to enable an electric signal to be input or output from or to the external device.

In this embodiment, the communication cable 310 is connectable to the terminal conforming to the IEEE1394 standard, viz., the communication cable 310 is usable as an interface cable in accordance with the IEEE1394 standard. However, the invention is applicable to the GPIB or RS232C standard, besides the IEEE1394 standard.

Specifically, the connector 318 has four pins for inputting or outputting a total of four signals, including two electrical signals of TPA and TPA* as the Data signal and two electrical signals of TPB and TPB* as the Strobe signal, from or to the external apparatus, and two pins for receiving a power supply for driving the transmission and reception module 314 and the GND from the external apparatus, or six pins in total (a so-called 6-pin connector). Alternatively, a 4-pin connector without the pins for the power supply and the GND may be employed.

Each pin of the connector 318 is connected to the driving and processing circuit 320, which is connected to the light emitting elements 322A, 322B and the light receiving elements 324A, 324B for the input/output module 316.

The driving and processing circuit 320 has each signal of TPA, TPA*, TPB and TPB* input via the connector 318 from the external apparatus. The driving and processing circuit 320 generates a lighting signal for the Data signal and a lighting signal for the Strobe signal, on the basis of the electrical signals input from the external apparatus, and controls the driving of the light emitting elements 322A, 322B, on the basis of the lighting signal for the Data signal and the lighting signal for the Strobe signal that are generated.

Also, the driving and processing circuit 320 has the light receiving signals input from the light receiving elements 324A, 324B. The driving and processing circuit 320 processes the light receiving signals from the light receiving elements 324A, 324B to generates the signals TPA, TPA*, TPB and TPB*, and output them to the external apparatus connected to the connector 318.

The transmission and reception module 314 employs a power source supplied via the connector 318 from the external apparatus to drive the driving and processing circuit 320, the light emitting elements 322 and the light receiving elements 324.

The operation of this embodiment will be set forth below.

The communication cable 310 is employed to connect a digital video camera to a digital video deck, when dubbing a video picked up by the video camera in the digital video deck, for example. In this case, the digital video camera is connected to the digital video deck via the communication cable 310 by fitting the connector 318 provided in the transmission and reception module 314 at one end of the communication cable 310 into a terminal according to IEEE1394 standard provided in the digital video camera, and the connector 318 provided in the transmission and reception module 314 at the other end of the communication cable 310 into a terminal according to IEEE1394 standard provided in the digital video camera.

Figure 12:
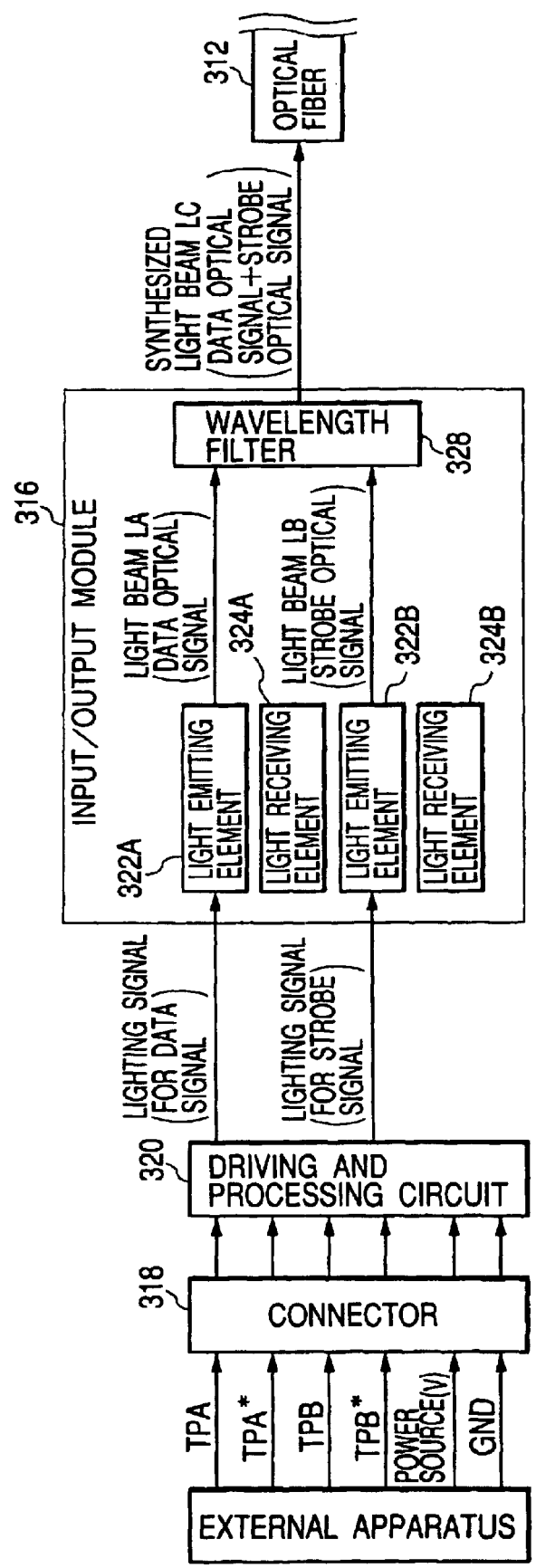
FIG. 12 is a block diagram showing the signal processing that is performed by a transmission and reception module on the transmission side.

In this way, if the connection between the external apparatuses is made via the communication cable 310, the electric signals TPA and TPA* as the Data signal and TPB and TPB* as the Strobe signal are output from the external apparatus on the signal transmission side, and input via the connector 318 connected to the external apparatus into the transmission and reception module 314, as shown in FIG. 12. Also, an electric power (supply voltage and GND) is supplied via the 318 from the external apparatus on the signal transmission side to the transmission and reception module 314, placing the transmission and reception module 314 in operable state. In the following, the transmission and reception module 314 on the side where the electrical signals are input from the external apparatus is referred to as the transmission side, and the transmission and reception module 314 on the other side is referred to as the receiving side.

The electric signals passed from the external apparatus into the transmission and reception module 314 on the transmission side are input into the driving and processing circuit 320, which then generates the lighting signals for Data signal and Strobe signal, on the basis of the input electric signals. A lighting signal for Data signal is generated on the basis of either one of the TPA and TPA* signals, and a lighting signal for Strobe signal is generated on the basis of either one of the TPB and TPB* signals.

And the driving and processing circuit 320 controls the driving of the light emitting element 322A of the input/output module 316 on the basis of the generated lighting signal for Data signal to output a light beam LA corresponding to the Data signal from the light emitting element 322A. Thereby, the Data signal is output as an optical signal (Data light signal) from the light emitting element 322A.

Also, the driving and processing circuit 320 controls the driving of the light emitting element 322B of the input/output module 316 on the basis of the generated lighting signal for Strobe signal to output a light beam LB corresponding to the Strobe signal from the light emitting element 322B. Thereby, the Strobe signal is output as an optical signal (Strobe light signal) from the light emitting element 322B.

That is, the driving and processing circuit 320 converts the Data signal and the Strobe signal input as the electric signals from the external apparatus into the optical signals, respectively.

Of the light beam LA (Data light signal) output from the light emitting element 322A, a predetermined quantity of light is transmitted through the beam splitter 326A to be incident upon the wavelength filter 328. Also, of the light beam LB (Strobe light signal) output from the light emitting element 322B, a predetermined quantity of light is transmitted through the beam splitter 326B to be incident upon the wavelength filter 328. And the light beam LA is transmitted through the wavelength filter 328, and the light beam LB is reflected by the wavelength filter 328, so that the light beams LA and LB are synthesized and output from the wavelength filter 328. A light beam resulting from the light beams LA and LB synthesized is referred to as a synthesized light beam LC.

The synthesized light beam LC of the light beams LA and LB output from the wavelength filter 328 is incident upon one end face of the optical fiber 312 connected to the input/output module 316, and transmitted via the optical fiber 312 to the other end face, viz., to the transmission and reception module 314 on the receiving side.

Figure 13:
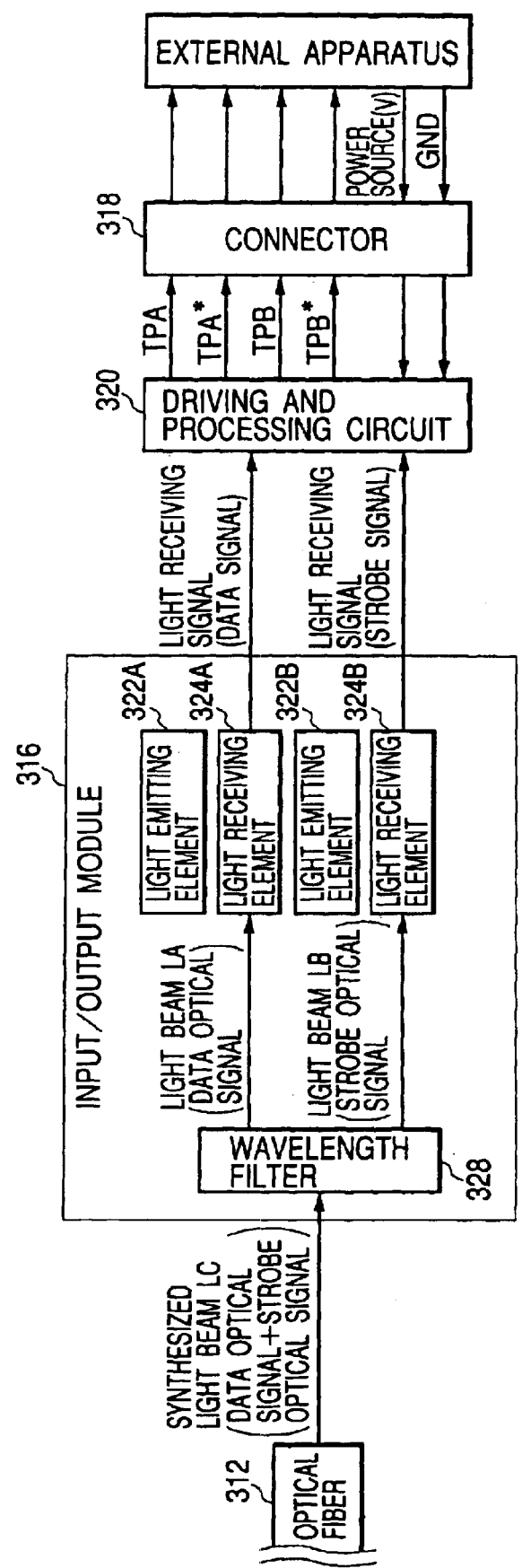
FIG. 13 is a block diagram showing the signal processing that is performed by a transmission and reception module on the reception side.

The synthesized light beam LC transmitted through the optical fiber 312 is output from the other end face, and then input into the input/output module 316 of the transmission and reception module 314 on the receiving side, as shown in FIG. 13. The synthesized light beam LC output from the other end face of the optical fiber 312 is input into the input/output module 316 to be firstly incident upon the wavelength filter 328.

The wavelength filter 328 transmits a light having the wavelength λ1 of the incident synthesized light beam LC, and reflects a light having the wavelength λ2. That is, the wavelength filter 328 separates the synthesized light beam LC into the light beams LA and LB.

And the separated light beam LA travels in a direction toward the beam splitter 326A, in which a predetermined quantity of light is reflected by the beam splitter 326A, and guided into the light receiving element 324A to be incident upon the light receiving plane of the light receiving element 324A. Also, the separated light beam LB travels in a direction toward the beam splitter 26B, in which a predetermined quantity of light is reflected by the beam splitter 326B, and guided into the light receiving element 324B to be incident upon the light receiving plane of the light receiving element 324B.

The light receiving element 324A receives the light beam LA incident upon the light receiving plane, an electric signal according to the received light quantity as a light receiving signal being output to the driving and processing circuit320. Similarly, the light receiving element324B receives the light beam LB incident upon the light receiving plane, an electric signal according to the received light quantity as a light receiving signal being output to the driving and processing circuit 320.

The driving and processing circuit 320 generates the TPA and TPA* signals as the Data signal on the basis of the light receiving signal from the light receiving element 324A, and generates the TPB and TPB* signals as the Strobe signal on the basis of the light receiving signal from the light receiving element 324B. The TPA, TPA*, TPB and TPB* signals are electric signals.

For example, a value of the light receiving signal from the light receiving element 324A (or light receiving element 324B) is compared with the threshold value, a binary signal of 0 or 1 is generated as the TPA (or TPB) signal in accordance with its comparison result, and the value of 1 or 0 of the TPA signal is inverted to generate the TPA* (TPB*) signal.

That is, the Data signal and the Strobe signal that are transmitted as the optical signal via the optical fiber 312 from the input/output unit on the transmission side are converted into the electric signals, respectively. The conversion from the optical signal into the electric signal is referred to as an "inverse conversion" with respect to the conversion from the electric signal into the optical signal.

And the driving and processing circuit 320 outputs the generated TPA, TPA*, TPB and TPB* signals via the connector 318 to the external apparatus on the receiving side connected to the connector 318.

In this way, through the communication cable 310, two relevant electric signals input from the external apparatus are converted into the optical signals having different wavelengths in the transmission and reception module 314 on the transmission side to be incident upon the optical fiber 312, and the optical signals transmitted through the optical fiber 312 are inversely converted in the transmission and reception module 314 on the reception side and output to the external apparatus.

That is, in transmitting two signals simultaneously, the signals are optically transmitted, thereby eliminating the fear for the noise caused by electromagnetic induction that brought about the problem in STP. Thereby, the limited length of cable can be relieved, and the cable can be extended over 50 m, for example, as compared with the conventional 1394 standard metal cable.

Since the signal input or output between the communication cable 310 and the external apparatus is electric signal, and the conversion and the inverse conversion between the electric signal and the optical signal are performed in the transmission and reception module 314, the communication cable 310 can be substituted for the conventional metal cable for use to transmit the electric signal, or particularly, the 1394 standard metal cable in this embodiment.

Also, the connector 318 is a so-called 6-pin connector, and the required power source is supplied via the connector 318 to the transmission and reception module 314, resulting in reduction in size of the transmission and reception module 314.

Also, only one optical fiber 312 enables the simultaneous transmission of two signals (Data signal and Strobe signal), resulting in lower costs. The synthesis of two signals on the transmission side and the separation of two synthesized signals on the reception side can be easily implemented by employing the wavelength filter 328.

Such an optical transmission device construction is taken that the beam splitters 326A, 326B guide the light beams LA, LB output from the light emitting elements 322A, 322B toward the wavelength filter 328 to enter the optical fiber via the wavelength filter 328 on the transmission side, and guide the light beams LA, LB separated by the wavelength filter 328 to the light receiving elements 324A, 324B on the reception side, whereby the light beams LA, LB output from the light emitting elements 322A, 322B on the transmission side are received by the light receiving elements 324A, 324B on the reception side with less optical loss.

The transmission and reception module 314 does not require any optical parts, viz., can be constructed by so-called bulk products for the wavelength filter 328, the beam splitters 326, the light emitting elements 322, and the light receiving elements 324, with reduced costs.

Fifth Embodiment

In the above embodiment, the communication cable 310 has the optical fiber 312 and the transmission and reception module 314 integrated. However, the invention is not limited to this embodiment, but the transmission and reception module 314 may be formed apart from the optical fiber 312.

Figure 14:
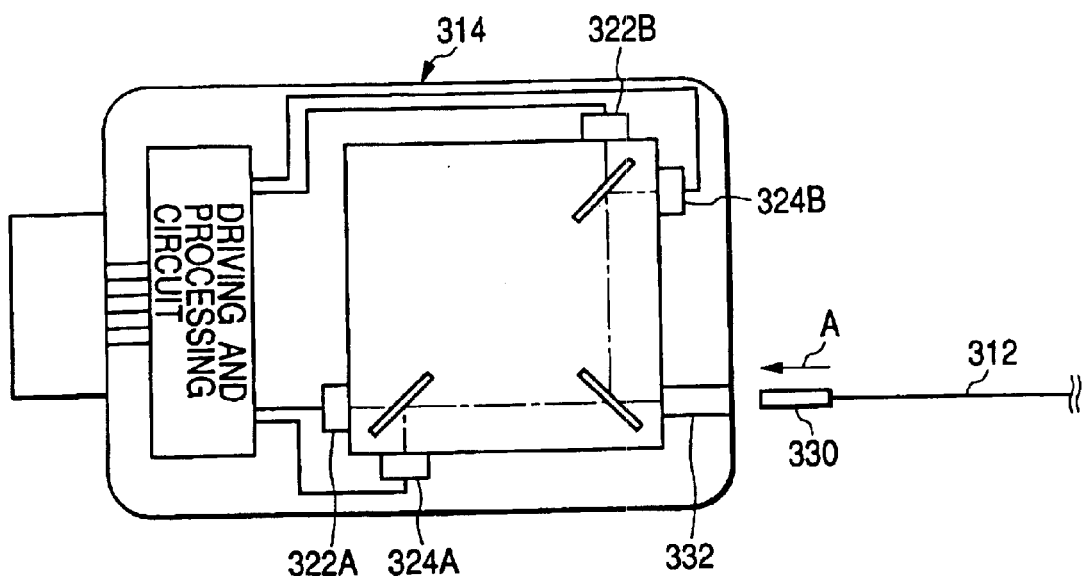
FIG. 14 is a constitution view of a communication cable according to a fifth embodiment of the invention.

Specifically, a plug 330 is formed by working both ends of the optical fiber 312 (only one end shown in FIG. 14), and a socket 332 as connecting means is formed by working the input/output module 316 of the transmission and reception module 314, thereby fabricating an optical connector, as shown in FIG. 14. And the plug 330 is fitted into the socket 332, so that the optical fiber 312 and the transmission and reception module 314 are connected, as indicated by the arrow A.

Thus, when the distance between the external apparatuses to be connected via the communication cable is changed, the optical fiber 312 may be provided in appropriate length.

As described above, the present invention has the excellent effect that it is possible to make the stable communications of two relevant signals in simple and inexpensive manner, irrespective of the device-to-device distance.

The above transmission and reception module 314 has a structure almost the same as that of an optical transmission and reception module 410 hereinafter described shown in FIG. 21. Thus, an optical transmission device can be manufactured within the transmission and reception module 314 according to a manner same as the first to third embodiments.

Sixth Embodiment

A sixth embodiment of the present invention will be described below with reference to the accompanying drawings.

Figure 15:
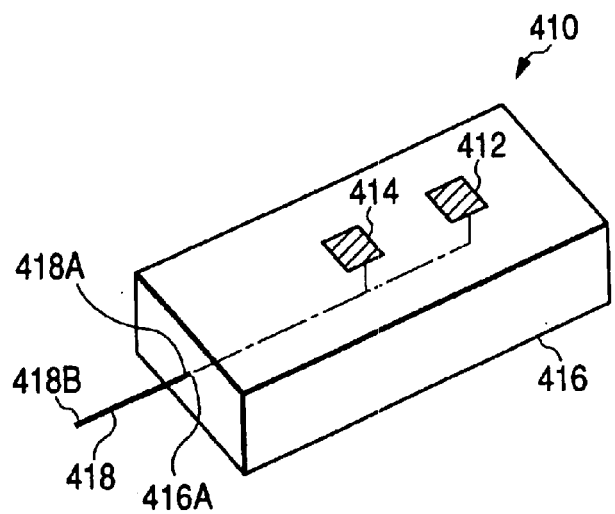
FIG. 15 is a schematic view of an optical transmission and reception module according to a sixth embodiment of the present invention.

As shown in FIG. 15, an optical transmission and reception module 410 comprises internally a light emitting element 412 such as an LD (Laser Diode) and a light receiving element 414 such as a PD (Photo Diode), and a housing 416 has an input/output opening 416A for inputting or outputting a light beam from or into the outside. The optical transmission and reception module 410 guides a light beam LB1 output from the light emitting element 412 via an optical member such as a beam splitter or a mirror into the input/output opening 416A, and guides a light beam input through the input/output opening 416A into the optical transmission and reception module 410 via the optical member to the light receiving element 414.

One end 418A (hereinafter referred to as an "end portion") of an optical fiber 418 is inserted through this input/output opening 416A, with the other end 418B (hereinafter referred to as "end portion") left outside the housing 416, whereby an optical transmission device 450 (see FIG. 18) for optically coupling the optical fiber 418 with the light emitting element 412 and the light receiving element 414 in a spatial area between the end portion 418A of the optical fiber 418 and the light emitting element 412 and the light receiving element 414 by employing an optical-transmission-device self-forming apparatus 420 as will be described later.

Figure 16:
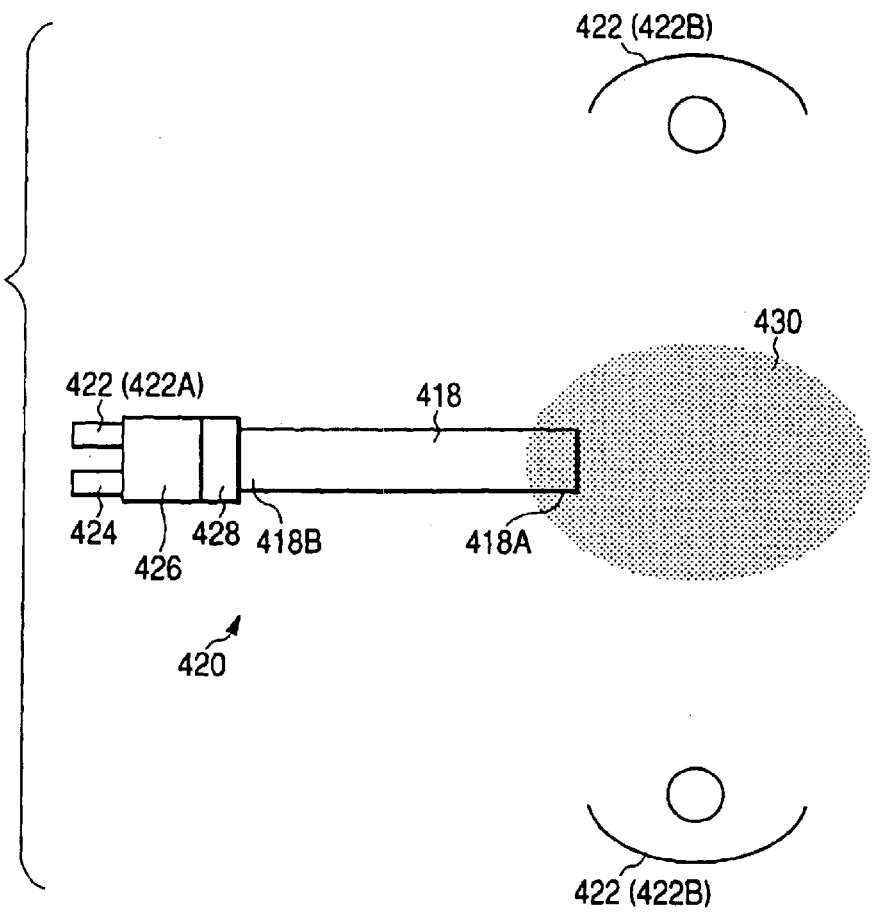
FIG. 16 is a view of an optical-transmission-device self-forming apparatus according to the sixth embodiment of the invention.

The constitution of the optical-transmission-device self-forming apparatus 420 will be described below in detail. The optical-transmission-device self-forming apparatus 420 comprises an optical-transmission-device forming light source 422, a photo-detector 424 for detecting the light, such as PD, an optical directional coupler 426, an optical connector module 428 for connecting the end portion 418B of the optical fiber 418 to the optical directional coupler 426, and a mixture solution 430 composed of two sorts of photosetting resin solutions having different setting start wavelengths and the different refractive indexes after hardening, which is filled into the housing 416 (i.e., the spatial area for forming the optical transmission device 450) in forming the optical transmission device 450, as shown in FIG. 16. Thus, the optical transmission device 450 is formed by a basically same manner as the first to third embodiments.

The optical-transmission-device forming light source 422 comprises two sorts of light sources for outputting the light having different wavelengths, more specifically, a short wavelength laser 422A for hardening one component of the mixture solution linearly and a ultraviolet lamp 422B for hardening the mixture solution 430 as a whole. The light beam output from the short wavelength laser 422A is hereinafter referred to as the light beam LB2.

The optical directional coupler 426 optically couples the optical fiber 418 connected via the optical connector module 428 with the short wavelength laser 422A and the photo-detector 424, and guides all or part of the light beam proceeding from the optical fiber 418 to the short wavelength laser 422A in accordance with a predetermined division ratio to the photo-detector 424. The photo-detector 424 receives this light beam and monitors the quantity of output light from the optical fiber 418.

That is, due to coupling through the optical directional coupler 426, the light beam LB1 output via the optical fiber 418 from the optical transmission and reception module 410 is led to the photo-detector 424, and the light beam LB2 output from the short wavelength laser 422A is introduced via the optical fiber 18 into the optical transmission and reception module 410. Also, owing to rectilinear propagation of the light beam, the paths of the light beams LB1 and LB2, viz., the optical axes of both light beams in both directions within the optical transmission and reception module 410 are almost coincident.

Instead of the optical directional coupler 426, a beam splitter may be employed to obtain the same effect.

Figure 17:
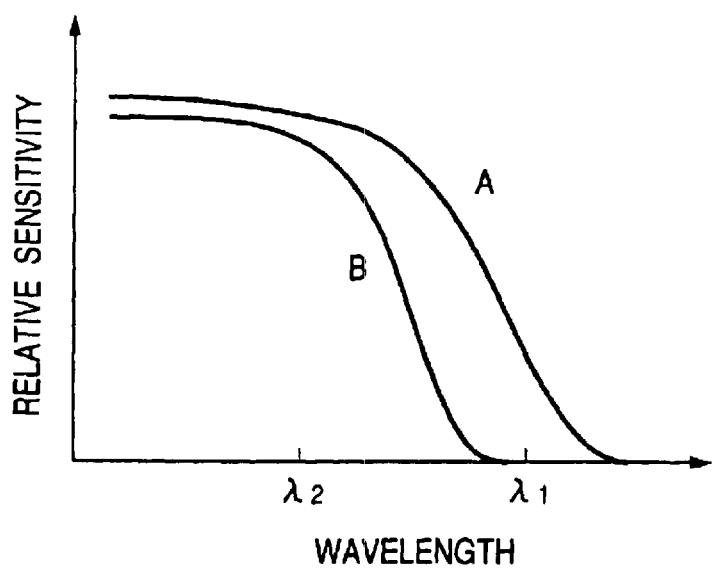
FIG. 17 is a spectral sensitivity characteristic diagram of a mixture solution according to the sixth embodiment of the invention.

The mixture solution 430 is composed of, for example, an epoxy-based, high refractive index photosetting resin solution with a refractive index of 1.49, and an acrylic, low refractive index photosetting resin solution with a refractive index of 1.34. The spectral sensitivity characteristics for both solutions are shown in FIG. 17. The transverse axis indicates the wavelength and the longitudinal axis indicates the relative sensitivity. A curve A is a spectral sensitivity characteristic for epoxy-based, high refractive index photosetting resin solution, and a curve B is a spectral sensitivity characteristic for acrylic, low refractive index photosetting resin solution.

As shown in FIG. 17, in the photosetting resin solutions, respective setting start wavelengths are selected to occur across the wavelength λ1 of the light beam LB2 output from the short wavelength laser 402A used for hardening. Also, respective setting start wavelengths are selected to be shorter than the wavelength of the light beam transmitted and received by the optical transmission and reception module 410, so that none of the photosetting resin solutions are hardened by the light beam LB1 output from the light emitting element 412. Since the photosetting resin solution is not hardened at a moment, the light beams LB1 and LB2 can be made the same wavelength. However, it is preferable that the wavelength of light beam LB1 or the sensitivity of solution is set so that the wavelength of light beam LB1 may not have influence on the hardening of the photosetting resin solution.

It is assumed here that the high refractive index photosetting resin solution is denoted as solution A and the low refractive index photosetting resin solution is denoted as solution B.

Generally, if the solutions A and B having different refractive indexes are mixed, the refractive index $n_{c1}$ of the mixture solution is represented in the expression (17) (refer to Yamaguchi, "Refractive Index" published by Kyoritsu (1982).

$$n_{C1} = [(2M(C_A)+1)/(1-M(C_A))]^{1/2}$$

$$M(C_A) = C_A(\rho/\rho_A)(n_{A1}^2-1)/(n_{A1}^2+2) + (1-C_A)(\rho/\rho_B)(n_{B1}^2-1)/(n_{B1}^2+2)$$

Where $\rho$ is the concentration of mixture solution, $\rho_A$ is the concentration of solution A, and $\rho_B$ is the concentration of solution B, $n_{A1}$ is the refractive index of solution A, $n_{B1}$ is the refractive index of solution B, and $C_A$ is weight percent of solution A.

If the photosetting resin solution with high refractive index $n_{A1}$ and the photosetting resin solution with low refractive index $n_{B1}$ are mixed at a certain ratio, the mixture solution 430 with refractive index $n_{C1}$ can be obtained, such as $n_{B1} < n_{C1} < n_{A1}$. And if the parameters $\rho$ to $C_A$ are selected, the refractive index $n_{C1}$ of the mixture solution can be determined uniquely. Also, the refractive index $n_{C1}$ after hardening satisfies the relation $n_{B2} < n_{C2} < n_{A2}$. Where $n_{A2}$ and $n_{B2}$ are refractive indexes of the solutions A and B after hardening.

The operation of this embodiment will be described below.

Figure 18A:
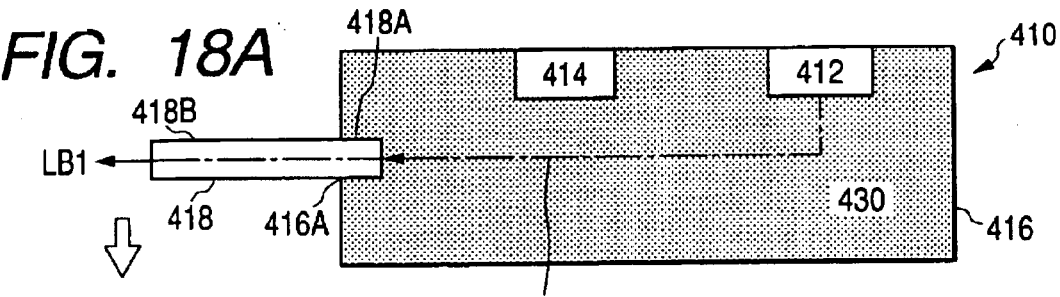
FIG. 18 is a view showing a procedure for forming an optical transmission device according to the sixth embodiment of the invention.

First of all, the mixture solution 430 is filled in the housing 430 of the optical transmission and reception module 410, and the end portion 418A of the optical fiber 418 is inserted through the input/output opening 416A of the optical transmission and reception module 410 to have its tip end immersed in the mixture solution 430, as shown in FIG. 18A. In this state, the light emitting element 412 is lighted to direct a light beam into the mixture solution that is filled in an area for forming the optical transmission device 450.

In FIG. 18, the mixture solution 430 is filled in the overall housing 416, but the mixture solution 430 may be filled in at least a spatial area for forming the optical transmission device 450 within the housing 416 of the optical transmission and reception module 410, more specifically in an area between the light emitting element 412 and the input/output opening 416A.

The light beam LB1 output from the light emitting element 412 passes through the beam splitter and the wavelength filter to enter an end face at the end portion 418A of the optical fiber 418 while traveling in the mixture solution 430. The light beam incident upon the end face at the end portion 418A is transmitted through the optical fiber 418, and output from the end face at the end portion 418B to enter the optical directional coupler 426 via the optical connector module 428. And part or all of the light beam LB1 is guided into the photo-detector 424 by the optical directional coupler 426, and detected by the photo-detector 424. The photo-detector 424 outputs a signal in accordance with the quantity of detected light (hereinafter referred to as a "light quantity signal"). Employing this light quantity signal, the quantity of light output via the optical fiber 418 to the outside among the light beam LB1 output from the light emitting element 412 can be grasped.

Figure 18B:
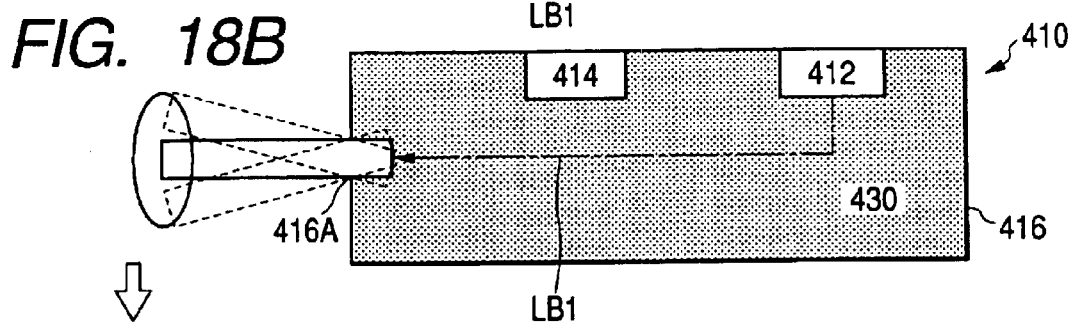
Figure 19:
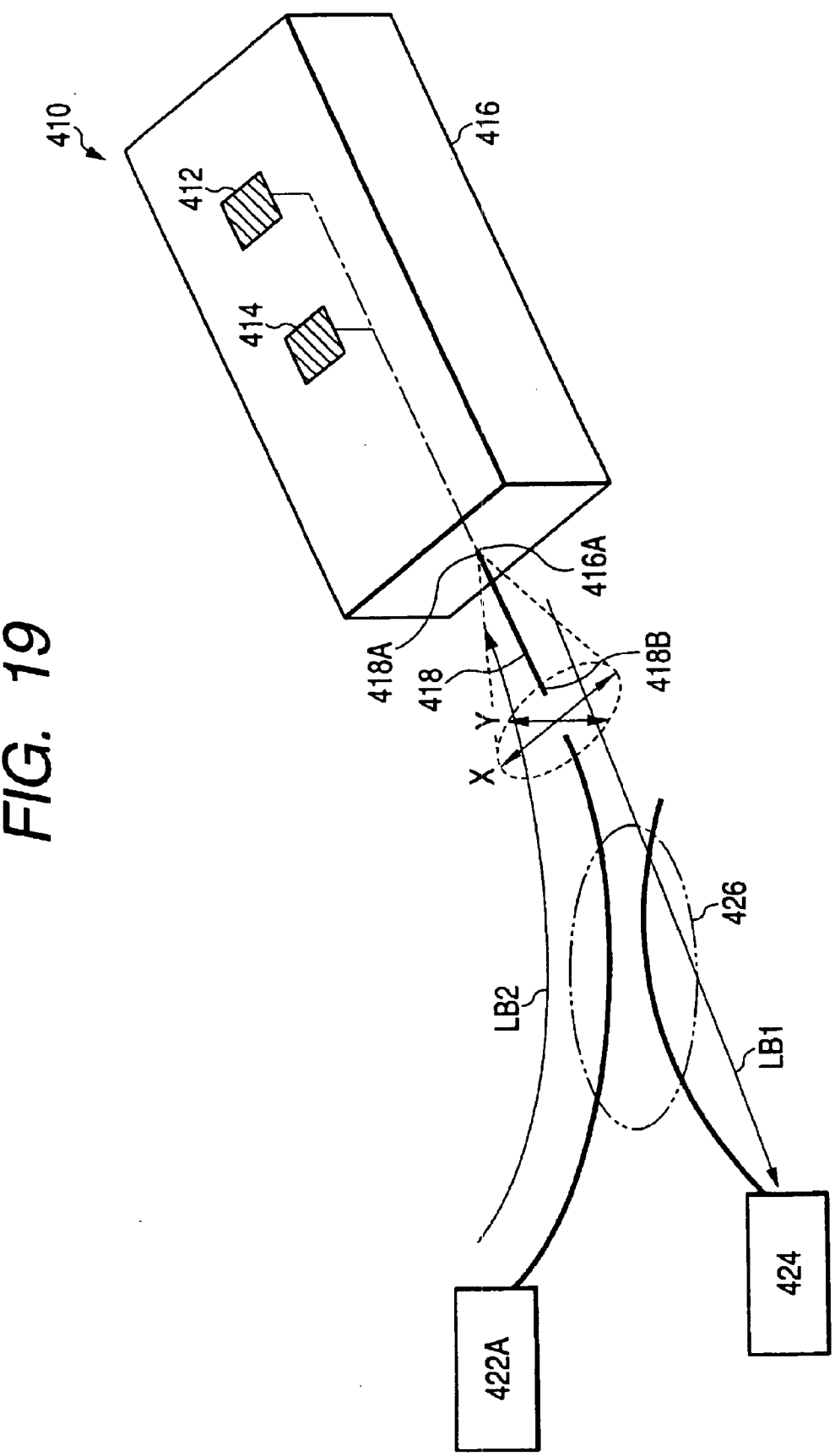
FIG. 19 is a concept view showing a method for forming the optical transmission device according to the sixth embodiment of the invention.

The optical fiber 418 is moved in the X-Y direction, while monitoring the light quantity signal output from this photo-detector 424 as shown in FIG. 18B and FIG. 19. Thereby, the optical fiber 418 has its axial direction changed with respect to a fixed point that is the position substantially coincident with the input/output opening 416A, so that the light input or output direction (axial direction for inputting or outputting the light) of the optical fiber 418 with respect to the optical transmission and reception module 410 is changed. Along with this change, the quantity of light incident upon the optical fiber 418, among the light beam LB1 output from the light emitting element 412, is changed, and therefore the quantity of light detected by the photo-detector 424 is changed.

And the position of the optical fiber 418 is adjusted to the position at which the quantity of detected light is at maximum as indicated by the light quantity signal. If this adjustment is made, the light emitting element 412 is turned off.

Figure 18C:
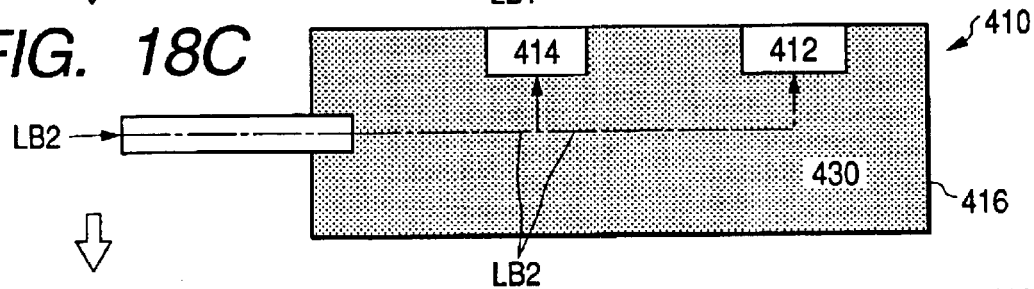

Then, the short wavelength laser 422A is lighted to enable the light beam LB2 to enter the mixture solution 430 in a state where the position of the optical fiber 418 after adjustment is maintained, as shown in FIG. 18C and FIG. 19. Namely, the light beam LB2 output from the short wavelength laser 422A is incident upon the end face at the end portion 418B of the optical fiber 418 via the optical directional coupler 426 and the optical connector module 428.

The light beam LB2 incident upon the end face at the end portion 418B is transmitted through the optical fiber 418, and output from the end face at the end portion 418A into the mixture solution 430 filled within the optical transmission and reception module 410.

The light beam LB2 output from the optical fiber 418 is passed almost inversely through the transmission line of the optical beam LB1 after adjustment in the mixture solution 430 to travel toward the light emitting element 412. Namely, the optical axis of the light beam LB2 is substantially the same as the light beam LB1 after adjustment. Also, in the typical optical transmission and reception module 414, the light beam entered through the input/output opening 416A inwards is branched into the light receiving element 414 by the beam splitter, and received by the light receiving element 414 to receive an optical signal, whereby a part of the light beam LB2 is also branched to travel toward the light receiving element 414.

Figure 18D:
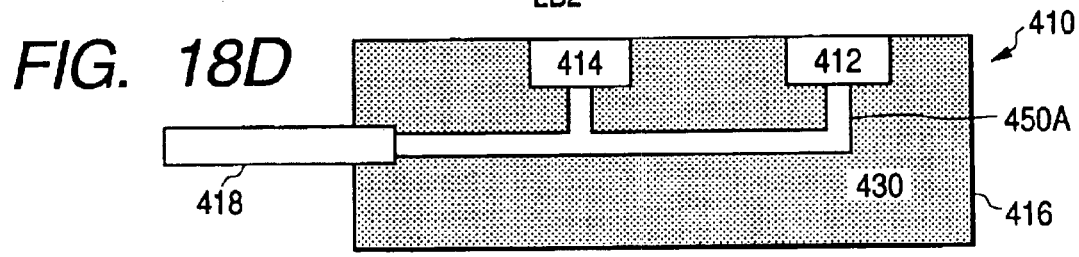

Herein, the short wavelength laser 422A is a He—Cd (helium Cadmium) laser having a wavelength $\lambda 1$ of 325 nm, for example. This wavelength is shorter than the setting start wavelength of solution A, and longer than that of solution B, as mentioned above. Accordingly, the solution A is only hardened. Also, with the light beam rays, the light beam LB2 can propagate almost rectilinearly. Hence, a linear core portion 450A (optical transmission line) is formed from the tip end (end portion 418A) of the optical fiber 418 in the mixture solution 430, and coupled with the light receiving element 410 and the light emitting element 412, as shown in FIG. 18D. At this time, the solution B on the optical axis is forced aside.

Figure 18E:
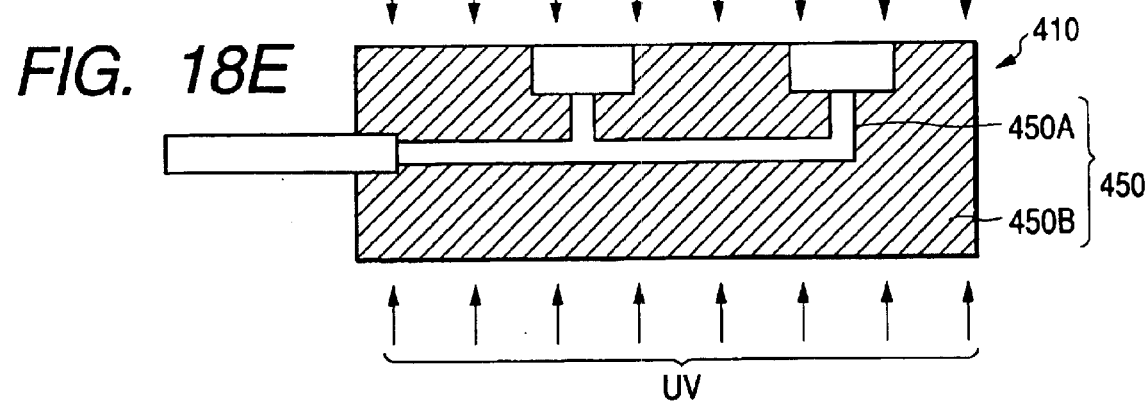

In this way, after the core portion 450A is formed, a ultraviolet ray UV having wavelength $\lambda 2$ is radiated uniformly from around the core portion 450A by a ultraviolet lamp 422B, as shown in FIG. 18E. This wavelength $\lambda 2$ is shorter than the setting start wavelengths of the solutions A and B, whereby the solutions A and B can be both hardened, as shown in FIG. 17. Thereby, the surroundings of the core portion 450A, viz., the entire mixture solution 430, can be hardened to form a clad portion 450B and produce the optical transmission device 450. Consequently, the tip end (end portion 418A) of the optical fiber 418 and the light emitting element 412 and the light receiving element 414 are coupled with the optical transmission device 450.

At this time, assuming that the refractive index before hardening for the clad portion 450B is $n_{c1}$ and the refractive index after hardening is $n_{c2}$, the refractive index $n_{A2}$ of the core portion 450A satisfies the following expression (18).

$$n_{A2} > n_{C2} > n_{C1} \tag{18}$$

The above expression means that the light transmission line is a step index type in which the refractive index $n_{A2}$ of the core portion 450A is higher than the refractive index $n_{C2}$ of the clad portion 450B. Accordingly, other light beam introduced into the optical transmission device 450 or other light beam introduced at an angle meeting the total reflection condition as will be described later propagates, while being totally reflected through the core portion 450A of the optical transmission device 450.

In this way, in this embodiment, the mixture solution 430 is filled in the area for forming the optical transmission device 450 within the light transmission module 410, and the optical fiber 418 having the end portion 418A inserted into the optical transmission and reception module 410 through the light input/output opening 416A is optically coupled with the short wavelength laser 422 and the photo-detector 424, as shown in FIG. 19. Then the light beam LB1 is output from the light emitting element 412, and the optical fiber 418 is moved in the X-Y direction, so that the light quantity of the light beam LB1 output via the optical fiber 418 to the outside may be almost at maximum. After the light input/output direction of the optical fiber 418 is adjusted, the short wavelength laser 422A is lighted to form the core portion 450A. Subsequently, a ultraviolet ray UV from the ultraviolet lamp 422B is directed over the mixture solution 430 to form the clad portion 450B. Thereby, the optical transmission device 450 is formed between the tip end of the optical fiber 418 and the light emitting element 412 and the light receiving element 414.

Thereby, the formed optical transmission device 450 can transmit the light beam at almost maximum efficiency to the optical transmission and reception module 410. That is, it is unnecessary for the formed optical transmission device 450 to adjust the optical axis of the light emitting element 412 or the light receiving element 414 within the optical transmission and reception module 410, resulting in optical loss inside. That is, it is possible to produce the optical transmission and reception module 410 that can transmit and receive the optical signal efficiently.

The optical transmission device 450 can be formed in a state where the tip end (18A) of the optical fiber 418 is immersed in the mixture solution 430, thereby securing the optical fiber 418 by means of the clad portion 450B formed. Thereby, it is possible to produce simply a so-called Pig-Tail type device in which the optical fiber 418 is formed integrally with the optical transmission and reception module 410 in a state where the other end 418B of the optical fiber 418 is extended from the housing 416.

Figure 20:
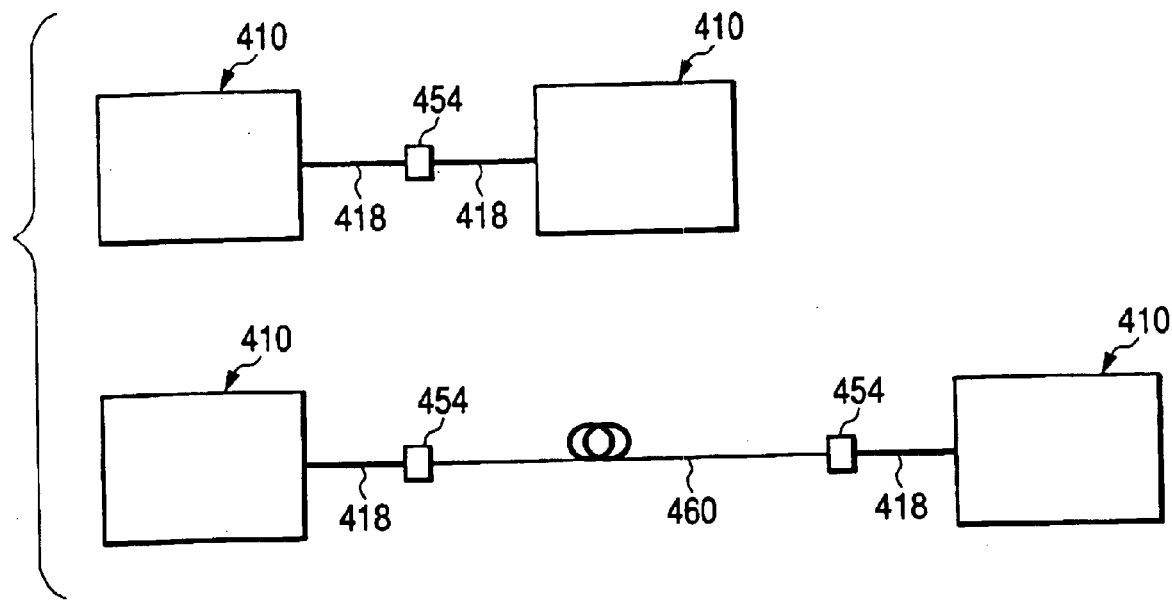
FIG. 20 is a diagram showing a connection example of an optical transmission and reception module produced with the method for forming the optical transmission device as shown in FIG. 19.

When the bi-directional communications are performed between the optical transmission and reception modules 410 of the Pig-Tail type, the optical fiber 418 for each optical transmission and reception module 410 may be connected by the optical connector 454, as shown in FIG. 20. Also, when the optical telecommunications are performed, if another optical fiber 460 is connected between the optical fibers 418 for the optical transmission and reception modules 410 by the optical connector 454, the communication distance can be simply extended. Also, the length of the optical fiber 418 extending from the housing 416 may be as short as about 10 cm, because the optical fiber can be extended easily.

The optical transmission and reception module 410 may be in any form, so long as it can transmit or receive the optical signal to or from the outside. An example of the optical transmission and reception module will be set forth below which can transmit and receive two sorts of optical signals at the same time employing two light beams having different wavelengths.

Figure 21:
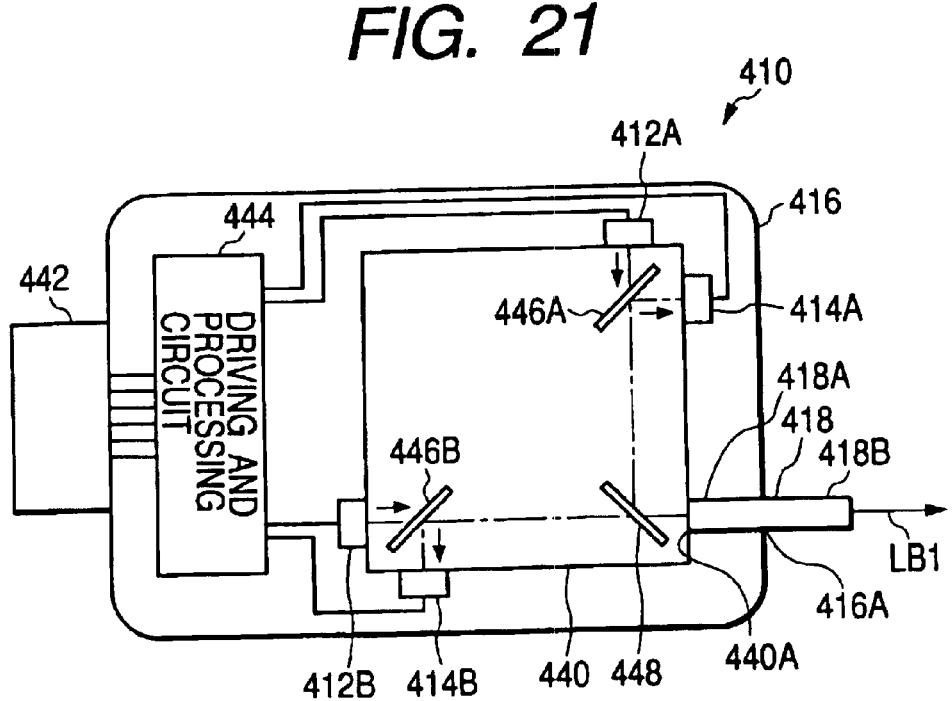
FIG. 21 is a detailed view showing one example of the optical transmission and reception module.
Figure 22:
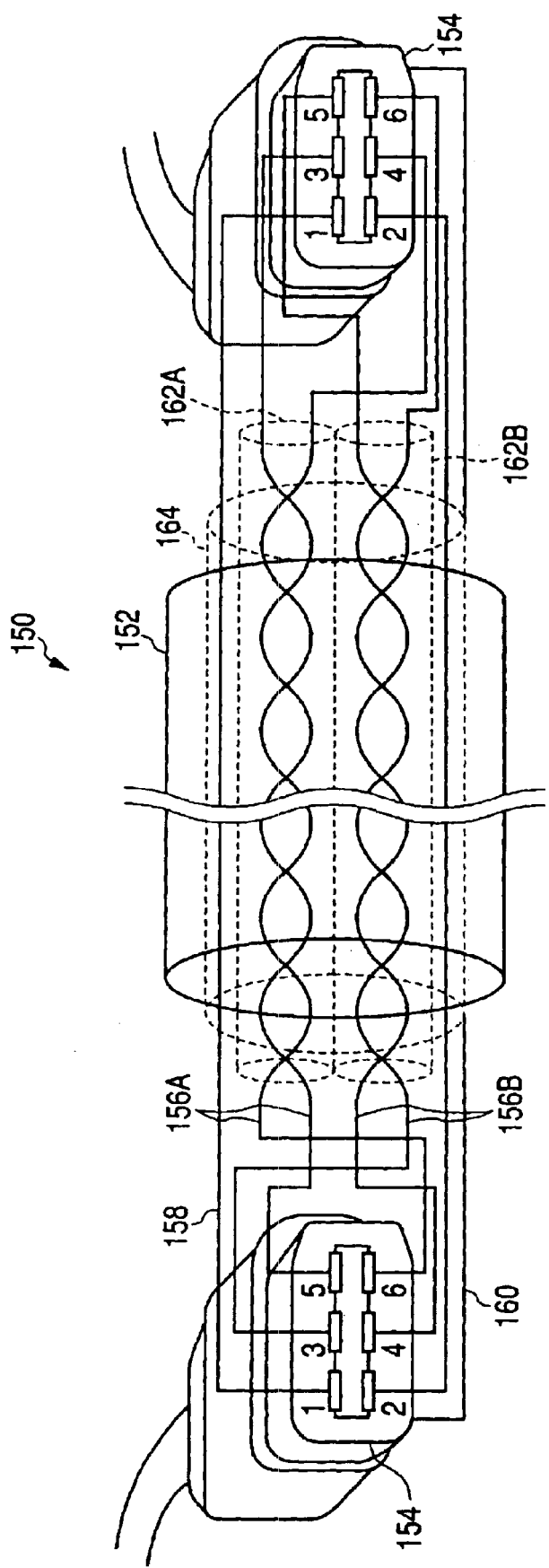
FIG. 22 is a cross-sectional view showing how the self-forming optical transmission device produces core-axis misalignment.

The optical transmission and reception module 410 as shown in FIG. 21 has the same structure as that of the optical transmission and reception module 314. It comprises an input/output module 440 for inputting or outputting an optical signal from or to the end face of the optical fiber 418, a connector 442 as electrical signal input/output means connected to an external apparatus to make the input or output of an electrical signal from or to the external apparatus, and a driving/processing circuit 444 as conversion means.

The housing of the input/output module 440 is formed with an opening 440A, in which an optical guide 450 is formed by inserting one end portion 418A of the optical fiber 418 through the light input/output opening 416A of the housing 416 for the light transmission/reception module 410 itself into the opening 440A.

Also, the input/output module 440 comprises two pairs of light emitting elements 412 and light receiving elements 414 as first and second optical signal input/output means. In the following, one pair is a light emitting element 412A and a light receiving element 414A, and the other pair is a light emitting element 412B and a light receiving element 414B.

The light emitting elements 412A and 12B output light beams having different wavelengths λ3 and λ4, respectively. Specifically, the light emitting element 412A outputs a light beams having a wavelength λ3 of 650 nm and the light emitting element 412B outputs a light beams having a wavelength λ4 of 520 nm in this embodiment. This is because the typical POF has the wavelength band (so-called window) having low optical loss at a wavelength of 650 nm and in a range of wavelength from 470 to 550 nm.

The light receiving elements 414A and 414B receives a light beam incident upon the light receiving plane, and output an electrical signal in accordance with the received quantity of light. This electrical signal is hereinafter referred to as a light receiving signal.

The beam splitters 446A, 446B are placed as guiding means in a traveling direction of the light beam output from the light receiving elements 412A and 412B. The beam splitters 446A, 446B transmit a predetermined quantity of light among the light beam and reflect a predetermined quantity of light so that the transmitted light quantity and the reflected light quantity may be at a certain division ration (e.g., division ration of 1:1). The beam splitters 446A, 446B may have a deflecting optical function of the deflecting beam splitter to regulate the ratio between the transmitted light and the reflected light at will.

At a position at which the optical paths of light beams intersect in a traveling direction of the light beam. transmitted through the beam splitters 446A, 446B, a wavelength filter 448 as synthesis/separation means for transmitting the light beam having a predetermined wavelength and the light beam having another predetermined wavelength is placed. More particularly, the wavelength filter 448 transmits the light beam having wavelength λ3 and reflects the light beam having wavelength λ4 to synthesize two light beams having different wavelengths that are output from the light emitting elements 412A, 412B. The wavelength filter 448 will function as a half mirror in other wavelength bands.

The light beam synthesized by this wavelength filter 448 is incident upon the end face at the end portion 418A of the optical fiber 418 inserted into the opening 440A, transmitted through the optical fiber 418 toward the end portion 418B and output from the end face at the end portion 418B.

On the optical path of light beam for the input/output module 440, for example, a condenser lens may be disposed to condense the light beam to enter the optical fiber 418, or for example, a collimator lens is disposed to make the light beam parallel, so that the light beam may be incident upon the optical fiber 418 to be parallel to the optical axis of the optical fiber 418, thereby reducing the optical loss on the end face of the optical fiber 418.

On one hand, the light beam input from the optical fiber 418 into the input/output module 440 is incident upon the wavelength filter 44B, the light beam having wavelength λ3 is transmitted to travel in a direction to the beam splitter 446A, and the light beam having wavelength λ4 is reflected to travel in a direction to the beam splitter 446B.

The light beam having wavelength λ3 and the light beam having wavelength λ4 are reflected by predetermined quantities of light by the beam splitters 446A and 446B, for example, at a division ratio of 1:1, respectively, and guided toward the light receiving elements 414A and 414B to be incident upon the light receiving planes of the light receiving elements 414A and 414B, respectively. In the case where there is no need of considering the lower communication stability due to the optical loss, both or one of the light receiving elements may be arranged side by side with the light emitting elements to be paired in accordance with, for example, the output light quantity of the light emitting element or the significance of the transmitting signal, thereby omitting the beam splitters.

The connector 442 is connectable to the input/output terminal on the side of external device to enable an electric signal to be input or output from or to the external device. In this embodiment, the optical transmission and reception module 410 is connectable to the terminal in accordance with the IEEE1394 standard, viz., the optical transmission and reception module 410 is usable as an interface in accordance with the IEEE1394 standard. Specifically, the connector 442 has fourpins for inputting or outputting a total of four signals, including two electrical signals of TPA and TPA* as the Data signal and two electrical signals of TPB and TPB* as the Strobe signal, from or to the external apparatus, and two pins for receiving a power supply for driving the transmission and reception module 410 and the GND from the external apparatus, or six pins in total (a so-called 6-pin connector). Alternatively, a 4-pin connector may be employed by omitting the pins for the power supply and the GND.

In this embodiment, the IEEE1394 standard is exemplified, but the invention is not limited to the IEEE1394 standard. Besides the IEEE1394 standard, the GPIB or RS232C standard may be also employed.

Each pin of the connector 442 is connected to the driving and processing circuit 444, which is then connected to the light emitting elements 412A, 412B and the light receiving elements 414A, 414B for the input/output module 440.

The driving and processing circuit 444 has each signal of TPA, TPA*, TPB and TPB* input via the connector 442 from the external apparatus. The driving and processing circuit 444 generates a lighting signal for the Data signal and a lighting signal for the Strobe signal, on the basis of an electrical signal input from the external apparatus, and controls the driving of the light emitting elements 412A, 412B, on the basis of the lighting signal for the Data signal and the lighting signal for the Strobe signal that are generated.

Also, the driving and processing circuit 444 has a light receiving signal input from the light receiving elements 14A, 14B. The driving and processing circuit 444 processes the light receiving signal from the light receiving elements 414A, 414B to generates each signal of TPA, TPA*, TPB and TPB*, and output it via the connector 442 to the external apparatus connected to the connector 442.

The transmission and reception module 410 employs a power supply via the connector 442 from the external apparatus to drive the driving and processing circuit 444, the light emitting elements 412 and the light receiving elements414.

When the optical transmission device 450 is produced within the optical transmission and reception module 410 as constituted above according to the invention, the mixture solution 430 is filled in the input/output module 440, the end portion 418A of the optical fiber 418 is passed through the input/output opening 416A of the optical transmission and reception module 410 into the opening 440A of the input/output module 440, and the tip end at the end portion 418A is immersed in the mixture solution 430, for example. In this state, the light emitting elements 412A and 412B are lighted, a predetermined quantity of light among the light beam output from the light emitting element 412A is transmitted through the beam splitter 46A to be incident upon the wavelength filter 448. Also, a predetermined quantity of light among the light beam output from the light emitting element 412B is transmitted through the beam splitter 446B to be incident upon the wavelength filter 448. And the light beam output from the light emitting element 412A is transmitted through the wavelength filter 448, and the light beam output from the light emitting element 412B is reflected by the wavelength filter 448, so that the light beams are synthesized. A synthesized light beam is incident upon the end face at the end portion 418A of the optical fiber 418, transmitted through the optical fiber and output from the end face at the end portion 418B.

After the light input/output direction for the optical fiber 41B is adjusted so that the quantity of light of the synthesized light output from the optical fiber 418 may be almost at maximum, the short wavelength laser 422A is lighted while maintaining the state after adjustment.

In this case, the light beam LB2 output from the short wavelength laser 422A is incident upon the end face of the optical fiber 418B and transmitted through the optical fiber 418 to be output from the end face of the optical fiber 418A into the mixture solution 440 filled within the light input/output module 440. And first of all, the light beam is incident upon the wavelength filter 448, which transmits a part of the light beam and reflects its other part because it operates as a half mirror for the light beam LB2. Namely, the light beam LB2 is divided into the directions toward the light emitting elements 412A and 412B by the wavelength filter 444B, a predetermined quantity of light among the part of the light beam LB2 traveling in the direction toward the light emitting element 412A is transmitted through the beam splitter 446A to travel to the light emitting element 412A, and the remaining quantity of light is reflected by the beam splitter 446A and guided in the direction toward the light receiving element 414A. Also, a predetermined quantity of light among the other part of the light beam LB2 traveling in the direction toward the light emitting element 412B is transmitted through the beam splitter 446B to travel directly to the light emitting element 412B, and the remaining quantity of light is reflected by the beam splitter 446B and guided in the direction toward the light receiving element 414B.

In this way, the light beam LB2 output from the short wavelength laser 422A is divided into the directions toward the light emitting elements 412A, 412B and the light receiving elements 414A, 414B by the wavelength filter 448, and the beam splitters 446A and 446B, whereby the core portion 450A (optical transmission line) is formed in the mixture solution 430 to be branch from the end portion 418A of the optical fiber 418 into the light emitting elements 412A, 412B and the light receiving elements 414A, 414B.

Subsequently, the ultraviolet lamp 422B is lighted to direct ultraviolet rays UV from around the mixture solution 430 to harden the entire mixture solution 430, thereby forming the clad portion 450B. Thereby, the optical transmission device 450 can be formed to couple the optical fiber 418 with the light emitting elements 412A, 412B and the light receiving elements 414A, 414B between the tip end of the optical fiber 418 and the light emitting elements 412A, 412B and the light receiving elements 414A, 414B.

By forming the optical transmission device 450 in this manner, the optical transmission and reception module 410 conforming to the IEEE1394 standard of the Pig-Tail type can be produced simply.

In this embodiment, each of the core portion 450A and the clad portion 450B is formed by changing the wavelength of the irradiation light. In addition, the core portion 450A and the clad portion 450B can be also formed by changing an amount of exposure as described in the second embodiment.

As described above, the present invention has the superior effect that the optical axis alignment after forming the optical transmission device is unnecessary.

This invention is not limited to the aforementioned description of the mode for carrying out the invention and the embodiments thereof at all, and includes various modifications that can be conceived by those skilled in the art without departing from the scope of claim for a patent.

What is claimed is:

1. A jig for manufacturing an optical waveguide device provided with at least one optical component and a predetermined number of input-output ends, said jig being employed by mounted on a transparent container in which a photo-curable resin solution and said optical component is contained, said jig comprising:

a housing; and the predetermined number of light inlets provided in said housing at predetermined positions corresponding to said input-output ends;

wherein a first light at a predetermined wavelength is guided into said transparent container through at least one of said light inlets to cure said photo-curable resin solution to thereby form optical waveguides in a direction of a first optical axis and a direction of a second optical axis changed by said optical component in said photo-curable resin solution so that said optical component is connected to said light inlets with said optical waveguides, whereby said optical waveguide device having said predetermined number of input-output ends is manufactured.

2. A jig for manufacturing an optical waveguide device according to claim 1, wherein said at least one light inlet is provided with a hole into which an optical fiber is fitted.

3. A jig for manufacturing an optical waveguide device according to claim 1, further comprising an optical condensing system attached to at least one of said light inlets through which said first light at said predetermined wave length is guided into said transparent container.

4. A jig for manufacturing an optical waveguide device according to claim 1, further comprising an adjusting device for adjusting at least one of a position and an angle of said optical component relative to said first and second optical axis of said first light guided into said transparent container.

5. A jig for manufacturing an optical waveguide device according to claim 1, wherein said housing containing said predetermined number of light inlets is separable into a plurality of parts.

6. A method of manufacturing an optical waveguide device comprising the steps of:

inserting at least one optical component in a transparent container at a predetermined position;

filling said transparent container with a first photo-curable resin solution;

mounting a jig onto said transparent container;

guiding a first light at a predetermined wavelength into said transparent container through at least one of said light inlets;

curing said first photo-curable resin solution thereby forming optical waveguides so that said optical component is connected to said light inlets with said optical waveguides; and forming an optical waveguide device having said predetermined number of input-output ends.

7. A method of manufacturing an optical waveguide device according to claim 6, wherein said at least one light inlet is provided with a hole into which an optical fiber with which said first light at said predetermined wavelength is output is fitted.

8. A method of manufacturing an optical waveguide device according to claim 6, wherein at least opposite two ends of each of said optical waveguides are fixed to said transparent container.

9. A method of manufacturing an optical waveguide device according to claim 6, wherein at least one of a position and an angle of said optical component is adjustable from an outside of said transparent container; and said at least one of the position and the angle of said optical component is adjusted after said photo-curable resin solution is injected into said transparent container so that a second light input through one of said light inlets is output through another of said light inlets while said second light has a wavelength incapable of curing said photo-curable resin solution.

10. A method of manufacturing an optical waveguide device according to claim 6, further comprising the steps of:

removing an uncured part of said first photo-curable resin solution in surroundings of said optical waveguides from said transparent container after said optical waveguides are formed; and embedding said optical waveguides in a low-refractive-index resin solution having a refractive index lower than that of each of said optical waveguides and solidifying said low-refractive-index resin solution.

11. A method of manufacturing an optical waveguide device according to claim 10, wherein said low-refractive-index resin solution is a second photo-curable resin solution or a heat-curable resin solution which is highly mutually soluble in said first photo-curable resin solution with which said optical waveguides are formed.

12. A method of manufacturing an optical waveguide device according to claim 6, wherein said photo-curable resin solution is a mixture solution of a high-refractive-index photo-curable resin solution and a low-refractive-index photo-curable resin solution different in curing initiating wavelength; and a light at a first predetermined wavelength capable of curing only said high-refractive-index photo-curable resin solution is guided into said transparent container through at least one of said light inlets to form said optical waveguides, and after a formation of said optical waveguides, a light at a second predetermined wavelength capable of curing both said high-refractive-index photo-curable resin solution and said low-refractive-index photo-curable resin solution is radiated onto a whole uncured part of said mixture solution in surroundings of said optical waveguides to thereby solidify said mixture solution.

13. A method of manufacturing an optical waveguide device according to claim 6, wherein said predetermined wavelength used for a formation of said optical waveguides is different from wavelengths of optical signals with which said optical guide device is operated after said optical waveguide device is formed.

14. An optical waveguide device manufactured by a method according to claim 6, wherein at least one component of any optical elements and photoelectric conversion elements is coupled with said input-output ends of said optical waveguide device.

* * * * *